(12) United States Patent
Jung et al.

(10) Patent No.: US 9,447,239 B2
(45) Date of Patent: Sep. 20, 2016

(54) THERMOSENSITIVE COPOLYMERS, FORWARD OSMOSIS WATER TREATMENT DEVICES INCLUDING THE SAME, AND METHODS OF PRODUCING AND USING THE SAME

(71) Applicant: Samsung Electronics Co., Ltd., Suwon-Si, Gyeonggi-Do (KR)

(72) Inventors: Bo Kyung Jung, Yongin-si (KR); Jae Eun Kim, Hwaseong-si (KR); Sung Soo Han, Hwaseong-si (KR); Hyo Kang, Seoul (KR); Hyo Rang Kang, Anyang-si (KR); Jung Im Han, Yongin-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 483 days.

(21) Appl. No.: 13/845,471

(22) Filed: Mar. 18, 2013

(65) Prior Publication Data

US 2013/0240444 A1    Sep. 19, 2013

(30) Foreign Application Priority Data

Mar. 19, 2012 (KR) .................. 10-2012-0027724
Mar. 7, 2013  (KR) .................. 10-2013-0024638

(51) Int. Cl.
*C08G 69/42* (2006.01)
*B01D 61/00* (2006.01)
(Continued)

(52) U.S. Cl.
CPC .............. *C08G 69/42* (2013.01); *B01D 61/002* (2013.01); *C02F 1/445* (2013.01); *C08G 73/10* (2013.01)

(58) Field of Classification Search
CPC ................ B01D 2311/103; B01D 2311/106; B01D 61/005; B01D 61/002; C02F 1/445; C02F 1/44; C02F 1/15272; C02F 1/52; C02F 1/56; C02F 1/54; C08G 69/42; C08G 73/10
USPC .......................................... 523/125; 525/54.1
See application file for complete search history.

(56) References Cited

U.S. PATENT DOCUMENTS 6,663,965 B2   12/2003  Poncelet
7,442,515 B2 * 10/2008  Ratner et al. .................. 435/7.2
(Continued)

FOREIGN PATENT DOCUMENTS

CN    101024697 A    8/2007
EP    1 832 341      9/2007
(Continued)

OTHER PUBLICATIONS

Li et al., Composite Polymer Hydrogels as Draw Agents in Forward Osmosis and Solar Dewatering, 7, Soft Matter 10048, 10048-10056 (2011).*

(Continued)

*Primary Examiner* — David C Mellon
*Assistant Examiner* — Liam Royce
(74) *Attorney, Agent, or Firm* — Harness, Dickey & Pierce, P.L.C.

(57) ABSTRACT

A thermosensitive copolymer may include a first repeating unit having a temperature-sensitive oligomer and a second repeating unit having an ionic moiety and a counter ion to the ionic moiety. The temperature-sensitive oligomer may be an oligomer including a repeating unit derived from a unsaturated monomer with a moiety represented by Chemical Formula 1 or Chemical Formula 2, or an oligomer including a repeating unit derived from a heterocyclic compound having C, N, O, and a C=N bond in its ring.

\*—C(=O)N($R_2$)($R_3$)    [Chemical Formula 1]

$R_2$ and $R_3$ may each independently be hydrogen or a linear or branched C1 to C6 alkyl group, a C3 to C7 cycloalkyl group, or a C6 to C10 aryl group, $R_2$ and $R_3$ may not both be hydrogen, and $R_2$ and $R_3$ may be combined to form a nitrogen containing heterocycle.

[Chemical Formula 2]

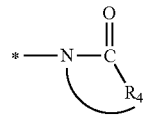

$R_4$ may be a C2 to C5 alkylene group.

30 Claims, 5 Drawing Sheets

(51) Int. Cl.
*C08G 73/10* (2006.01)
*C02F 1/44* (2006.01)

(56) References Cited

U.S. PATENT DOCUMENTS

| | | | |
|---|---|---|---|
| 7,560,029 | B2 | 7/2009 | McGinnis |
| 7,879,243 | B2 | 2/2011 | Al-Mayahi et al. |
| 8,002,989 | B2 | 8/2011 | McGinnis |
| 8,021,553 | B2 | 9/2011 | Iyer |
| 8,221,629 | B2 | 7/2012 | Al-Mayahi et al. |
| 2005/0145568 | A1 | 7/2005 | Mc Ginnis |
| 2006/0144789 | A1* | 7/2006 | Cath et al. ............ 210/641 |
| 2006/0204555 | A1* | 9/2006 | Yang et al. ............ 424/443 |
| 2006/0237366 | A1 | 10/2006 | Al-Mayahi et al. |
| 2007/0015901 | A1 | 1/2007 | Sikes et al. |
| 2007/0211130 | A1* | 9/2007 | Wexler et al. ............ 347/105 |
| 2008/0319375 | A1* | 12/2008 | Hardy ............ 604/22 |
| 2010/0108587 | A1 | 5/2010 | McGinnis |
| 2010/0155329 | A1 | 6/2010 | Iyer |
| 2010/0224476 | A1* | 9/2010 | Cath et al. ............ 203/10 |
| 2010/0302992 | A1 | 12/2010 | Zhuang |
| 2011/0114558 | A1 | 5/2011 | Al-Mayahi et al. |
| 2011/0155666 | A1 | 6/2011 | Prakash et al. |
| 2011/0203994 | A1 | 8/2011 | McGinnis et al. |
| 2012/0018365 | A1 | 1/2012 | Iyer |
| 2012/0091062 | A1 | 4/2012 | McGinnis |
| 2012/0211423 | A1 | 8/2012 | Kim et al. |
| 2012/0228222 | A1 | 9/2012 | McGinnis et al. |
| 2012/0267297 | A1 | 10/2012 | Iyer |
| 2013/0180919 | A1 | 7/2013 | Kim et al. |

FOREIGN PATENT DOCUMENTS

| | | | |
|---|---|---|---|
| EP | 1 651 570 | | 6/2011 |
| KR | 10-2005-0056288 | | 6/2005 |
| KR | 10-2011-0065291 | | 6/2011 |
| KR | 10-2011-0091153 | | 8/2011 |
| KR | 10-2012-0095293 | | 8/2012 |
| KR | 10-2013-0084531 | | 7/2013 |
| WO | WO 2010-043914 | A2 | 4/2010 |
| WO | WO 2010067063 | A1 * | 6/2010 |
| WO | WO 2011-099941 | A1 | 8/2011 |

OTHER PUBLICATIONS

Bach. et. al. Lower Critical Solution Temperature Behavior of Amphiphilic Copolymers Based on Polyaspartamide Derivatives. Journal of Applied Polymer Science, vol. 107, 509-513 Published online Sep. 20, 2007.*
Hahn et. al. Synthesis and Properties of Ionically Modified Polymers with LCST Behavior Macromolecules 1998, 31, 5616-5623.*
Dimitrov Thermosensitive water-soluble copolymers with doubly responsive reversibly interacting entities Prog. Polym. Sci. 32 (2007) 1275-1343.*
Lutz Point by Point Comparison of Two Thermosensitive Polymers Exhibiting a Similar LCST: Is the Age of Poly(NIPAM) Over? J. Am. Chem. Soc. 2006, 128, 13046-13047.*
Fujishige Intrinsic Viscosity-Molecular Weight Relationships for Poly(N-isopropylacrylamide) solutions Polymer Journal, vol. 19, No. 3, pp. 297-300 (1987).*
Arotcarena et. al. Switching the Inside and the Outside of Aggregates of Water-Soluble Block Copolymers with Double Thermoresponsivity J. Am. Chem. Soc. 2002, 124, 3787-3793.*
Dautzenberg et. al. Formation, structure, and temperature behavior of polyelectrolyte complexes between ionically modified thermosensitive polymers Langmuir 2000, 16, 9070-9081.*
Lowe et. al Synthesis and solution properties of zwitterionic polymers Chem. Rev. 2002, 102, 4177-4189.*
Maeda et. al Hydration changes during thermosensitive association of a block copolymer consisting of LCST and UCST blocks Macromol. Rapid Commun. 2004, 25, 1330-1334.*
European Patent Office Search report for Application No. 13159989.6-1306, dated Jun. 20, 2013.
Inoue, T., et al. "Temperature sensitivity of a hydrogel network containing different LCST oligomers grafted to the hydrogel backbone"—Polymer Gels and Networks 5 (1997) 561-575.
MacHarg, J, et al. "West Coast researchers seek to demonstrate SWRO affordability"—The International Desalination & Water Reuse Quarterly—Nov.-Dec. 2004, vol. 14/No. 3.
Qingchun Ge, et al. "Exploration of polyelectrolytes as draw solutes in forward osmosis processes" Elsevier Water Research 46 (2012) 1318-1326.
Chinese Office Action dated Apr. 7, 2016 in corresponding Chinese Patent Application No. 201310086994.9 with English translation.

* cited by examiner

THERMOSENSITIVE COPOLYMERS, FORWARD OSMOSIS WATER TREATMENT DEVICES INCLUDING THE SAME, AND METHODS OF PRODUCING AND USING THE SAME

CROSS-REFERENCE TO RELATED APPLICATIONS

This application claims priority under 35 U.S.C. §119 to Korean Patent Application No. 10-2012-0027724, filed in the Korean Intellectual Property Office on Mar. 19, 2012, and Korean Patent Application No. 10-2013-0024638, filed in the Korean Intellectual Property Office on Mar. 7, 2013, the entire contents of each of which are incorporated herein by reference.

BACKGROUND

1. Field

The present disclosure relates to thermosensitive copolymers, forward osmosis water treatment devices including the same, and methods of producing and using the same.

2. Description of the Related Art

Osmosis (or forward osmosis) refers to a phenomenon wherein water moves from a lower solute concentration solution to a solution of a higher solute concentration by osmotic pressure. Reverse osmosis is a method of artificially applying pressure to move water in the opposite direction.

Desalination through reverse osmosis is a known technique in the field of water treatment. Reverse osmosis desalination involves artificially applying a relatively high pressure and thus entails relatively high energy consumption. To increase energy efficiency, a forward osmosis process using the principle of osmotic pressure has been suggested, and as a solute for the osmosis draw solution, ammonium bicarbonate, sulfur dioxide, aliphatic alcohols, aluminum sulfate, glucose, fructose, potassium nitrate, and the like have been used. Among them, an ammonium bicarbonate draw solution is most commonly used and after the forward osmosis process, the draw solute (i.e., ammonium bicarbonate) may undergo decomposition into ammonia and carbon dioxide at a temperature of about 60° C. and be removed. Further, newly suggested draw solutes include magnetic nanoparticles having hydrophilic polymers such as peptides and low molecular weight materials attached thereto (that can be separated by a magnetic field), a polymer electrolyte such as a dendrimer (that can be separated by a UF or NF membrane), and the like.

Because decomposition of ammonium bicarbonate requires heating at about 60° C. or higher, removal of the draw solute including this compound entails a relatively high level of energy consumption. In addition, because a complete elimination of ammonia is difficult (if not impossible), water produced by forward osmosis using ammonium bicarbonate as the draw solute is not suitable for drinking water due to the odor of ammonia. Meanwhile, magnetic nanoparticles present difficulties in terms of redispersing the agglomerated particles being separated from the draw solution by using a magnetic field. It is also difficult (if not impossible) to completely remove the nanoparticles. Thus, the toxicity of the nanoparticles may pose additional problems. In addition, as the thermosensitive dendrimers or the magnetic nanoparticles coated with a hydrophilic polymer or a low molecular weight substance have a size ranging from several nanometers to tens of nanometers, filters such as a nanofiltration or ultrafiltration membrane may be required. Moreover, there may be difficulties in terms of redispersion after being agglomerated.

SUMMARY

Some example embodiments relate to a thermosensitive copolymer that may provide a draw solution generating a relatively high osmotic pressure, having a relatively low level of reverse draw solute diffusion, and allowing relatively easy recovery and recycling of the solute.

Some example embodiments relate to a process for preparing the thermosensitive copolymer.

Some example embodiments relate to forward osmosis water treatment devices and methods of using a draw solution including the thermosensitive copolymers and water.

According to one example embodiment, a thermosensitive copolymer may include a first repeating unit having a temperature-sensitive oligomer grafted thereto and a second repeating unit having an ionic moiety and a counter ion to the ionic moiety, wherein the temperature-sensitive oligomer is an oligomer including a repeating unit derived from a unsaturated monomer with a moiety represented by Chemical Formula 1 or Chemical Formula 2, or an oligomer including a repeating unit derived from a heterocyclic compound having C, N, and O and having a C=N bond in its ring:

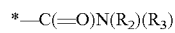
[Chemical Formula 1]

In Chemical Formula 1, $R_2$ and $R_3$ may each independently be hydrogen or a linear or branched C1 to C6 alkyl group, a C3 to C7 cycloalkyl group, or a C6 to C10 aryl group, $R_2$ and $R_3$ may not both be hydrogen, and $R_2$ and $R_3$ may be combined to form a nitrogen containing heterocycle,

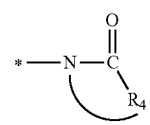
[Chemical Formula 2]

In Chemical Formula 2, $R_4$ may be a C2 to C5 alkylene group.

The thermosensitive copolymer may be a polyaminoacid derivative.

The heterocyclic compound may be an oxazoline compound represented by Chemical Formula 3.

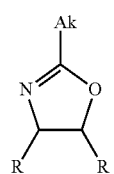
[Chemical Formula 3]

In Chemical Formula 3, Ak may be a linear or branched C1 to C10 alkyl group, and each R is independently hydrogen or a C1 to C3 alkyl group.

The temperature-sensitive oligomer may include a repeating unit derived from an N-alkyl(meth)acrylamide represented by Chemical Formula 4, repeating unit derived from an N-vinyl lactam represented by Chemical Formula 5, or a combination thereof, and optionally it may further include a repeating unit derived from (meth)acrylamide:

[Chemical Formula 4]

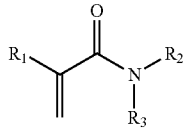

In Chemical Formula 4, $R_1$ may be hydrogen or methyl, $R_2$ and $R_3$ may each independently be hydrogen or a linear or branched C1 to C6 alkyl group, a C3 to C7 cycloalkyl group, or a C6 to C10 aryl group, $R_2$ and $R_3$ may not both be hydrogen, and $R_2$ and $R_3$ may be combined to form a nitrogen containing heterocycle;

[Chemical Formula 5]

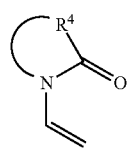

In Chemical Formula 5, $R_4$ may be a C2 to C5 alkylene group.

The temperature-sensitive oligomer may have a polymerization degree of about 2 to about 30.

The ionic moiety of the second repeating unit may be an anionic moiety selected from $-COO^-$, $-SO_3^-$, $-PO_3^{2-}$ and a combination thereof.

The second repeating unit may include an identical ionic moiety or may each independently include a different ionic moiety.

The counter ion may be selected from an alkali metal cation, an alkaline earth metal cation, and a combination thereof.

The mole ratio between the first repeating unit and the second repeating unit may be about 1:99 to about 60:40.

In the thermosensitive copolymer, the first repeating unit may be represented by Chemical Formula 6-1 and the second repeating unit may be represented by Chemical Formula 6-2:

[Chemical Formula 6-1]

[[Chemical Formula 6-2]

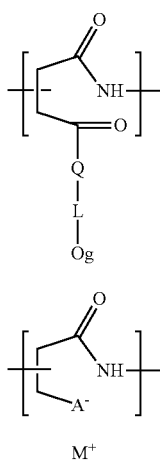

In Chemical Formulae 6-2 and 6-1, $A^-$ may be a group including an ionic moiety, $M^+$ may be a counter ion to the ionic moiety, Q may be $-NR-$ (wherein, R may be hydrogen or a C1 to C5 alkyl group) or $-S-$, L may be a direct bond, a substituted or unsubstituted C1 to C20 alkylene, or a substituted or unsubstituted C1 to C20 thioalkylene, and Og may be an oligomer having a repeating unit of Chemical Formula 7, an oligomer having a repeating unit of Chemical Formula 8, or an oligomer having a repeating unit of Chemical Formula 9.

[Chemical Formula 7]

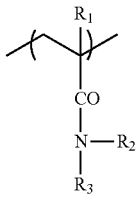

In Chemical Formula 7, $R_1$ may be hydrogen or methyl, $R_2$ and $R_3$ may each independently be hydrogen or a linear or branched C1 to C6 alkyl group, a C3 to C7 cycloalkyl group, or a C6 to C10 aryl group, $R_2$ and $R_3$ may not both be hydrogen, and $R_2$ and $R_3$ may be combined to form a nitrogen containing heterocycle;

[Chemical Formula 8]

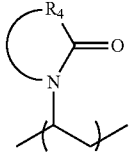

In Chemical Formula 8, $R_4$ may be a C2 to C5 alkylene group;

[Chemical Formula 9]

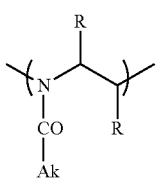

In Chemical Formula 9, Ak may be a linear or branched C1 to C10 alkyl group, and each R may independently be hydrogen or a C1 to C3 alkyl group.

In Chemical Formula 6, $A^-$ may be the same or different and may be selected from $-COO^-$, $-CONR-Z-SO_3^-$, $-CONR-Z-O-PO_3^{2-}$, $-CO-S-Z-SO_3^-$, and $-CO-S-Z-O-PO_3^{2-}$, R may be hydrogen or a C1 to C5 alkyl group, Z may be a substituted or unsubstituted C1 to C20 alkylene group, and $M^+$ may be $Na^+$, $K^+$, $Li^+$, $Ca^{2+}$, $Mg^{2+}$, $Ba^{2+}$, or a combination thereof.

The thermosensitive copolymer may have a number average molecular weight of about 5,000 to about 250,000

According to another example embodiment, provided is a method of producing a thermosensitive copolymer. The thermosensitive copolymer may include a first repeating unit having a temperature-sensitive oligomer grafted thereto and second repeating unit having an ionic moiety and a counter ion to the ionic moiety. The method may include preparing polysuccinimide; preparing a temperature-sensitive oligomer having an amine group or a thiol group at one end and including a repeating unit derived from a monomer represented by Chemical Formula 3, or a temperature-sensitive oligomer having an amine group or a thiol group at one end and including a repeating unit derived from a monomer represented by Chemical Formula 4, a repeating unit derived a monomer represented by Chemical Formula 5, or a combination thereof;

[Chemical Formula 3]

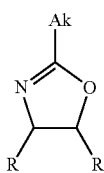

wherein, in Chemical Formula 3, Ak is a linear or branched C1 to C10 alkyl group, and each R is independently hydrogen or a C1 to C3 alkyl group;

[Chemical Formula 4]

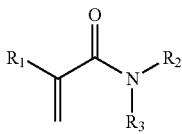

wherein, in Chemical Formula 4, $R_1$ is hydrogen or methyl, $R_2$ and $R_3$ are each independently hydrogen or a linear or branched C1 to C6 alkyl group, a C3 to C7 cycloalkyl group, or a C6 to C10 aryl group, $R_2$ and $R_3$ may not both be hydrogen, and $R_2$ and $R_3$ may be combined to form a nitrogen containing heterocycle,

[Chemical Formula 5]

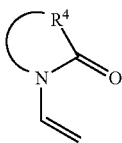

wherein, in Chemical Formula 5, $R_4$ is a C2 to C5 alkylene group; subjecting the polysuccinimide to a first reaction with the temperature-sensitive oligomer to open parts of succinimide rings in the polysuccinimide, thereby grafting the temperature-sensitive oligomer thereto; and subjecting the reaction product to a second reaction with an amine compound having an ionic moiety, a thiol compound having an ionic moiety, an inorganic base, or a combination thereof to open the remaining imide rings in the polysuccinimide and to introduce the ionic moiety and a counter ion.

The polysuccinimide may have a number average molecular weight of 5,000 or lower.

The amine compound having an ionic moiety may be a phosphoalkyl amine, a sulfoalkyl amine, or a combination thereof, and the inorganic base may be an alkalimetal hydroxide, an alkaline earth metal hydroxide, or a combination thereof.

According to another example embodiment, an osmotic draw solution may include an aqueous medium; and a draw solute being dissolved in the aqueous medium, wherein the draw solute includes a thermosensitive copolymer having a osmotic pressure-inducing polymer chain that includes an ionic moiety and a counter ion to the ionic moiety and having a temperature-sensitive oligomer covalently bonded onto the osmotic pressure-inducing polymer chain in a graft form and the draw solute is recoverable by phase separation at a temperature greater than or equal to a lower critical solution temperature.

The thermosensitive copolymer may have a lower critical solution temperature (LCST) of about 10 to about 50° C. at a concentration of 0.01 g/ml.

The thermosensitive copolymer may have solubility in water of greater than or equal to about 100 g/L at a temperature below the lower critical solution temperature (LCST), and solubility in water of less than or equal to about 1 g/L at a temperature of greater than or equal to the lower critical solution temperature (LCST).

When a temperature of the draw solution increases from a temperature lower than the LCST to a temperature higher than the LCST, about 50 wt % or more of a total of the draw solute may exhibit an increase by at least about 10 times in an aggregate size.

The temperature-sensitive oligomer may include an amide group and a aliphatic moiety being covalently bonded to a nitrogen atom of the amide group and being more hydrophobic than the amide group, wherein the aliphatic moiety is an oligomer either being covalently bonded with an carbon atom of the amide group or not being bonded therewith, or an oligomer including a repeating unit derived from a heterocyclic compound having C, N, and O and having a C=N bond in its ring.

According to another example embodiment, a forward osmosis water treatment device may include a feed solution including water and materials to be separated being dissolved in water; the aforementioned osmosis draw solution; a semi-permeable membrane contacting the feed solution on one side and the osmosis draw solution on the other side; a recovery system for removing the thermosensitive copolymer from a treated solution including water that moves from the feed solution to the osmosis draw solution through the semipermeable membrane by osmotic pressure; and a connector for reintroducing the thermosensitive copolymer removed from the recovery system to the osmosis draw solution.

The forward osmosis water treatment device may further include an outlet for discharging treated water produced by removing the thermosensitive copolymer from the treated solution in the recovery system.

The recovery system may include a microfiltration (MF) membrane, an ultrafiltration (UF) membrane, or a loose nanofiltration (NF) membrane.

The recovery system may include a temperature controller configured for heating the thermosensitive copolymer as removed to a temperature of its lower critical solution temperature (LCST) or higher to facilitate aggregation.

The recovery system may include a temperature controller configured for cooling the thermosensitive copolymers as removed to below a temperature of its lower critical solution temperature (LCST) to facilitate disintegration.

According to yet another example embodiment, a forward osmosis method for water treatment may include contacting a feed solution including water and materials to be separated being dissolved in water and the aforementioned osmosis draw solution with a semi-permeable membrane positioned therebetween to obtain a treated solution including the water that moves from the feed solution to the draw solution through the semi-permeable membrane by osmotic pressure; heating at least a portion of the treated solution to a temperature greater than or equal to the lower critical solution temperature (LCST) of the thermosensitive copolymer to cause aggregation of the thermosensitive copolymer in the treated solution; and removing the aggregated thermosensitive copolymer from the treated solution by filtration to obtain treated water.

The forward osmosis method for water treatment may further include cooling the thermosensitive copolymer as removed to below a temperature of its lower critical solution temperature (LCST) and reintroducing it into the osmosis draw solution that contacts the semi-permeable membrane.

The aforementioned thermosensitive copolymer may prepare a draw solution that may generate high osmotic pressure and it may be easily separated from the solution by means of a temperature change. Therefore, the forward osmosis water treatment devices and methods using the thermosensitive copolymer may be operated with higher efficiency of energy or higher efficiency of water treatment at a reduced cost.

DETAILED DESCRIPTION

Figure 1:
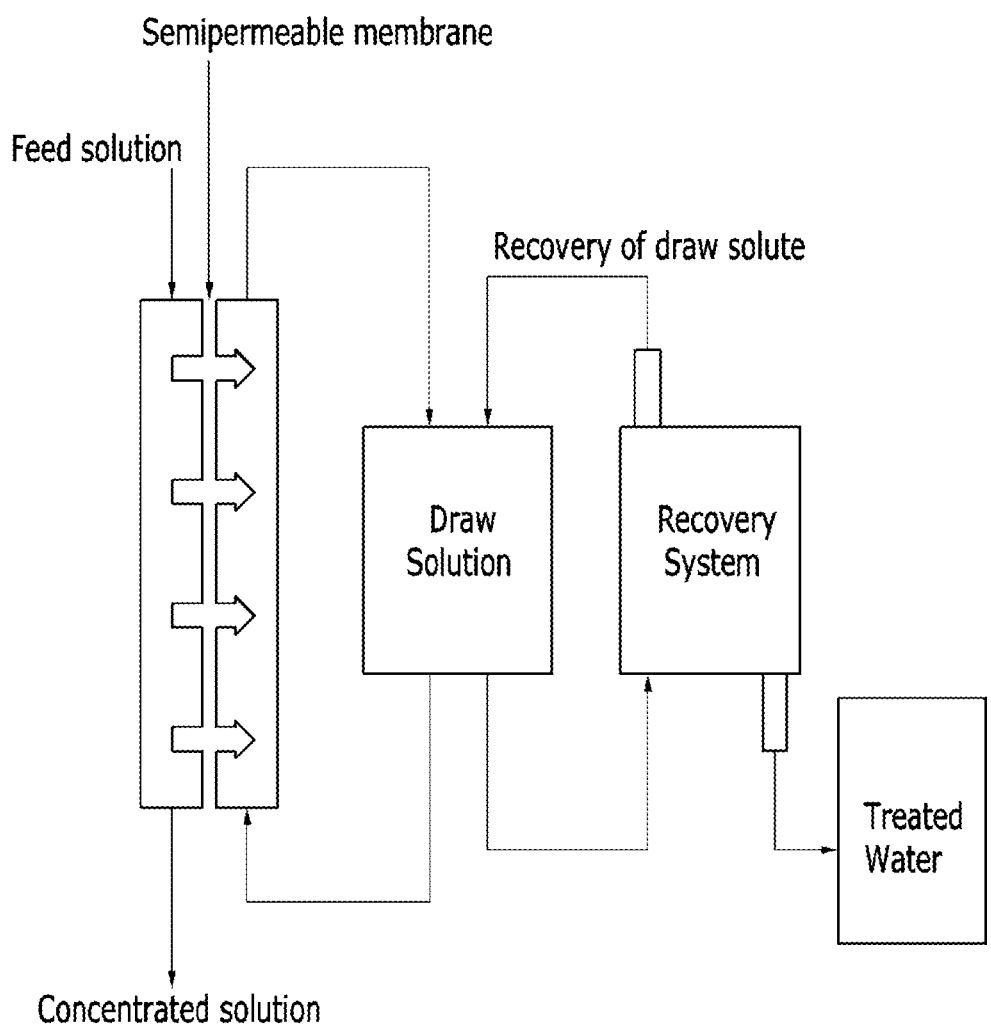
FIG. 1 is a schematic view of a forward osmosis water treatment device according to one example embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, the term "substitute" refers to replacing one or more of hydrogen in a corresponding group with a hydroxyl group, a nitro group, a cyano group, an amino group, a carboxyl group, a linear or branched C1 to C30 alkyl group, a C1 to C10 alkyl silyl group, a C3 to C30 cycloalkyl group, a C6 to C30 aryl group, a C2 to C30 heteroaryl group, a C1 to C10 alkoxy group, a halogen, or a C1 to C10 fluoro alkyl group.

The thermosensitive copolymer according to one example embodiment may include a first repeating unit having a temperature-sensitive oligomer grafted thereonto, and a second repeating unit including an ionic moiety and a counter ion to the ionic moiety. The thermosensitive copolymer may be a polyamino acid derivative. Specifically, the thermosensitive copolymer may have a polyaminoacid main chain. In other words, the thermosensitive copolymer may be a polyaminoacid based copolymer. The thermosensitive copolymer may include at least two different first repeating units having a temperature-sensitive oligomer grafted thereonto and/or at least two different second repeating units including an ionic moiety and a counter ion to the ionic moiety.

The temperature-sensitive oligomer grafted onto the first repeating unit of the copolymer may show a significantly decreased value of water solubility in response to a small change in temperature. The temperature-sensitive oligomer may be an oligomer including a repeating unit derived from an unsaturated monomer having a moiety represented by Chemical Formula 1 or Chemical Formula 2, or an oligomer including a repeating unit derived from a heterocyclic compound including C, N, and O and having a C=N bond in its ring.

*—C(=O)N($R_2$)($R_3$)   [Chemical Formula 1]

In Chemical Formula 1, $R_2$ and $R_3$ are each independently hydrogen or a linear or branched C1 to C6 alkyl group, a C3 to C7 cycloalkyl group, or a C6 to C10 aryl group, $R_2$ and $R_3$ may not both be hydrogen, and $R_2$ and $R_3$ may be combined to form a nitrogen containing heterocycle.

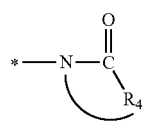

[Chemical Formula 2]

In Chemical Formula 2, $R_4$ is a C2 to C5 alkylene group.

Specifically, the temperature-sensitive oligomer may be an oligomer including a repeating unit derived from an oxazoline compound represented by Chemical Formula 3, or an oligomer including a repeating unit derived from an N-alkyl(meth)acrylamide represented by Chemical Formula 4, a repeating unit derived from an N-vinyl lactam represented by Chemical Formula 5, or a combination thereof.

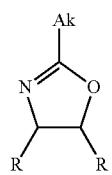

[Chemical Formula 3]

In Chemical Formula 3, Ak is a C1 to C10 and, specifically a C1 to C5, linear or branched alkyl group, for example, such as an ethyl group, a propyl group, a isopropyl group, a butyl group, an isobutyl group, a pentyl group, or an isopentyl group, and each R is independently hydrogen or a C1 to C3 alkyl group.

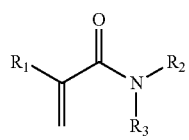

[Chemical Formula 4]

In Chemical Formula 4, $R_1$ is hydrogen or methyl, and $R_2$ and $R_3$ are the same as defined in Chemical Formula 1.

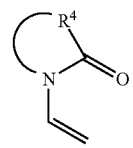

[Chemical Formula 5]

In Chemical Formula 5, $R_4$ is the same as defined in Chemical Formula 2.

When the temperature-sensitive oligomer is the oligomer including a repeating unit derived from an N-alkyl(meth)acrylamide, a repeating unit derived from an N-vinyl lactam, or a combination thereof, it may further include a repeating unit derived from a (meth)acrylamide, if necessary.

Specific examples of the oxazoline compound may include, but are not limited to, 2-methyl-oxazoline, 2-ethyl-2-oxazoline, 2-propyl-2-oxazoline, 2-isopropyl-2-oxazoline, 2-butyl-2-oxazoline, 2-isobutyl-2-oxazoline, 2-pentyl-2-oxazoline, 2-isopentyl-2-oxazoline, and a combination thereof. The oxazoline compound may be polymerized (e.g., via cationic polymerization) to prepare an oligomer including a repeating unit of Chemical Formula 9 and having a desired molecular weight. Detailed polymerization conditions and associated methods are known in the art and have not been reproduced herein in the interest of brevity.

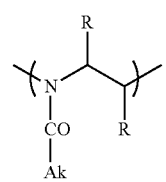

[Chemical Formula 9]

In Chemical Formula 9, Ak and R are the same as defined in Chemical Formula 3.

Specific examples of the N-alkyl(meth)acryl amide may include, but are not limited to, N-isopropyl(meth)acrylamide (NIPAAm), N-isobutyl(meth)acrylamide, N-isopentyl (meth)acrylamide, N,N-dimethyl(meth)acrylamide, N,N-ethylmethyl(meth)acrylamide, N,N-diethyl(meth)acrylamide (DEAAM), and a combination thereof. Specific examples of the N-vinyl lactam may include, but are not limited to, N-vinyl caprolactam (VCL), N-vinyl-2-pyrrolidone, N-vinyl-piperidone, and a combination thereof.

When the oligomer is a co-oligomer of a (meth)acrylamide and at least one of the N-alkyl(meth)acryl amide and the N-vinyl lactam, the mole fraction of the (meth)acryl amide in the total amount of the monomer may be no more than 40 mol %, specifically no more than 30 mol %, more specifically no more than 15 mol %, and most specifically no more than 10 mol %.

The N-alkyl(meth)acrylamide represented by Chemical Formula 4 or the N-vinyl lactam represented by Chemical Formula 5 may be polymerized (e.g., via radical polymerization) to prepare an oligomer including a repeating unit represented by Chemical Formula 7 and having a desired degree of polymerization or an oligomer including a repeating unit represented by Chemical Formula 8 and having a desired degree of polymerization.

[Chemical Formula 7]

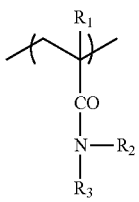

In Chemical Formula 7, $R_1$, $R_2$, and $R_3$ are the same as defined in the above Chemical Formula 4.

[Chemical Formula 8]

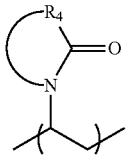

In Chemical Formula 8, $R_4$ is the same as defined in the above Chemical Formula 5.

Detailed conditions and manners of such polymerization are known in the art and have not been reproduced herein in the interest of brevity.

The second repeating unit of the thermosensitive copolymer includes an ionic moiety, which may be —COO$^-$, —SO$_3^-$, —PO$_3^{2-}$, or a combination thereof, and a counter ion, which carries an opposite charge to the ionic moiety and may be an alkali metal cation, an alkaline earth metal cation, or a combination thereof. The ionic moiety and the counter ion may be present while forming an ionic bond therebetween.

In the thermosensitive copolymer, a plurality of the second repeating unit may include the same ionic moiety as each other or may include independently different ionic moieties. In other words, the copolymer may include one type of the ionic moiety, or it may include different ionic moieties. By way of a non-limiting example, all the second repeating units of the thermosensitive copolymer may have —COO$^-$ as the ionic moiety. By way of another non-limiting example, parts of the second repeating units in the thermosensitive copolymer may have —COO$^-$ as the ionic moiety and the remaining parts of the second repeating units in the thermosensitive copolymer may have —SO$_3^-$ and/or —PO$_3^{2-}$.

Specifically, in the thermosensitive copolymer, the first repeating unit with a temperature sensitive oligomer grafted thereto may be represented by Chemical Formula 6-1 and the second repeating unit with the ionic moiety and the counter ion may be represented by Chemical Formula 6-2.

[Chemical Formula 6-1]

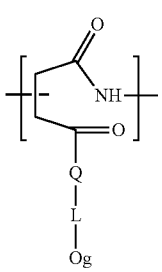

[Chemical Formula 6-2]

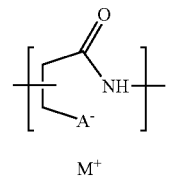

In Chemical Formulae 6-2 and 6-1, A$^-$ is a group including an ionic moiety, M$^+$ is a counter ion to the ionic moiety, Q is —NR— (wherein, R is hydrogen or a C1 to C5 alkyl group) or —S—, L is a direct bond, a substituted or unsubstituted C1 to C20 alkylene, or a substituted or unsubstituted C1 to C20 thioalkylene, and Og is an oligomer including a repeating unit of the above Chemical Formula 7, an oligomer including a repeating unit of the above Chemical Formula 8, or an oligomer including a repeating unit of the above Chemical Formula 9.

Specifically, A$^-$ is the same or different, and may be selected from —COO$^-$, —CONR—Z—SO$_3^-$, —CONR—Z—O—PO$_3^{2-}$, —CO—S—Z—SO$_3^-$, and —CO—S—Z—O—PO$_3^{2-}$, wherein R is hydrogen or a C1 to C5 alkyl, Z is a substituted or unsubstituted C1 to C20 alkylene, and M$^+$ may be selected from Na$^+$, K$^+$, Li$^+$, Rb$^+$, Ca$^{2+}$, Mg$^{2+}$, Ba$^{2+}$ and a combination thereof.

The thermosensitive copolymer has a lower critical solution temperature (LCST) and may exhibit sharply decreased water solubility in response to a small increase in a temperature, leading to precipitation thereof. As used herein, the term "temperature-sensitive" (or "thermosensitive") refers to a polymer or oligomer characteristic, whereby the solubility of a given polymer (or a given oligomer) in a certain solvent (e.g., water) significantly decreases at or above a critical temperature and the given polymer (oligomer) is reversibly aggregated or dissolved based on the critical temperature. As used herein, the lower critical solution temperature is a critical temperature, at or above which a solution (e.g., an aqueous solution) of a thermosensitive copolymer may show phase separation. In other words, the thermosensitive copolymer is miscible with water below the lower critical solution temperature. The lower critical solution temperature of the thermosensitive copolymer may exist in a range of about 10° C. to about 50° C., for example about 25° C. to about 50° C., and specifically about 30° C. to about 45° C. at a solution concentration of about 0.01 g/ml.

At a temperature lower than the LCST, the copolymer may be easily dissolved in water since the temperature-sensitive oligomer grafted onto the copolymer may form a hydrogen bond with water. At a temperature higher than or equal to LCST, the hydrophilicity of the copolymer may sharply decrease and the hydrophobic interactions between the oligomers grafted onto the copolymer become predominate. As a result, the copolymer has lower solubility in water and the inter- or intramolecular hydrophobic interactions force the copolymer to form an aggregated particle, which is then precipitated from the solution. The copolymer particles produced by the aggregation at a temperature higher than or equal to the LCST may have such an increased size that they may be easily separated from the solution.

In accordance with an example embodiment, the thermosensitive copolymer may form a first aggregated particle. Controlling the composition of the grafted temperature-sensitive oligomer or increasing the concentration of the copolymer in a solution makes intermolecular interactions between the copolymers easier to occur, leading to the formation of a second aggregated particle. By way of non-limiting examples, the controlling of the oligomer composition may include increasing the polymerization degree of the oligomer and/or increasing the amount of the first repeating unit in the copolymer (e.g., increasing the grafted amount of the temperature-sensitive oligomer). The second aggregated particle may have a further increased size, facilitating the separation of the copolymer from the solution. Accordingly, the removal of the copolymer particles may become easier (for example may be accomplished by means of a micro-filtration) even without using a highly energy-consuming means (e.g., a centrifuge, a reverse osmosis membrane, and a nanofiltration). Therefore, a draw solute including such thermosensitive copolymer may be readily separated from the osmosis draw solution.

The thermosensitive copolymer includes a second repeating unit having an ionic moiety and a counter ion thereto, both of which may impart ionicity to the copolymer. The ionicity may allow the thermosensitive copolymer to exhibit a larger hydrodynamic volume and to have higher solubility in water at a temperature below the LCST, resulting in a higher osmotic pressure generated by the aqueous solution of the copolymer. Such effects may become more remarkable as the ionic radius of the counter ion decreases. The ionic moiety is included in the polymer chain and the counter ion may be confined to the ionic moiety (via an interaction such as an ionic bonding). Therefore, when being used as a draw solute, the thermosensitive copolymer may induce higher osmotic pressure and keep the reverse draw solute diffusion at the minimum level. In addition, when the second repeating unit includes a suitable ionic moiety and a counter ion thereto, the resulting copolymer may be biocompatible and biodegradable, enhancing the utility of the copolymer as the draw solute for water purification.

In the thermosensitive copolymer, the oligomer grafted onto the first repeating unit may have a polymerization degree of about 2 to about 30, specifically about 2 to about 25, and more specifically about 4 to about 25. The thermosensitive copolymer including the first repeating unit with the temperature sensitive oligomer grafted thereonto and the second repeating unit with the ionic moiety and the counter ion may have a number average molecular weight ranging from about 5,000 to about 250,000, specifically from about 5,000 to about 100,000, more specifically from about 5,000 to about 50,000. When the polymerization degree of the oligomer and the number average molecular weight of the copolymer fall within the aforementioned ranges, respectively, the resulting thermosensitive copolymer may have higher solubility in water at a temperature lower than the LCST, thus being prepared as an aqueous solution having a higher concentration, and the resulting aqueous solution may generate higher osmotic pressure, inducing a higher water flux.

The thermosensitivity and the osmotic pressure may be controlled by changing the mole ratio between the first repeating unit and the second repeating unit. Without being bound by a certain theory, the higher the relative mole ratio of the first repeating unit is, the more significant the thermosensitivity may be, while an increase in the mole ratio of the second repeating unit may bring forth a higher osmotic pressure. In the thermosensitive copolymers according to an example embodiment, the mole ratio between the first repeating unit and the second repeating unit may range from about 1:99 to about 60:40, specifically from about 1:99 to about 40:60, further specifically from about 2:98 to about 20:80, more specifically from about 2:98 to about 10:90.

Within such a range of the mole ratio, the copolymer may exhibit more significant thermosensitivity and a higher osmotic pressure, as well.

The types of the thermosensitive copolymer may include, but are not limited to, a block copolymer, a random copolymer, or a graft copolymer.

In a solution, the thermosensitive copolymer may be (self-) agglomerated at a temperature higher than or equal to the lower critical solution temperature (LCST), resulting in a sharp increase in the particle size of the copolymer. When the temperature is higher than or equal to the LCST, the particle sizes of the thermosensitive copolymers of about 50 wt % or more in the solution may increase by at least about 10 times, specifically about 10 times to about 10,000 times, more specifically about 100 times to 10,000 times, and most specifically about 1000 times to 10,000 times in comparison with the case where the temperature is below the LCST. Such changes in the particle size may be determined by measuring a hydrodynamic diameter through the dynamic light scattering method. At a temperature higher than or equal to the LCST, the hydrodynamic diameter of the copolymer particle may range, for example, from about 100 nm to about 50 μm, specifically from about 300 nm to about 10,000 nm, more specifically from about 300 nm to about 5 μm.

At a temperature below the LCST, the thermosensitive copolymer has a water solubility of about 100 g/L or higher, and at a temperature higher than or equal to the LCST, it has a water solubility of about 10 g/L or lower. Specifically, the thermosensitive copolymer has a water solubility of about 200 g/L to about 800 g/L at a temperature below the LCST, while it has a water solubility of about 0.1 g/L to about 10 g/L at a temperature higher than or equal to the LSCT. More specifically, the thermosensitive copolymer has water solubility of about 500 g/L to about 800 g/L at a temperature below the LCST, while it has water solubility of about 0.1 g/L to about 1 g/L at a temperature higher than or equal to the LSCT.

The thermosensitive copolymer may be prepared as an aqueous solution, which may generate an osmotic pressure of 20 atm or higher at a temperature below the LCST and at a concentration of 0.4 g/mL. The osmotic pressure may be determined in accordance with a freezing-point depression method or by using a membrane osmometer. Because the thermosensitive copolymer may generate such a level of osmotic pressure, it holds great potential for being used as a solute for the osmosis draw solution. Moreover, the copolymer may find its utilities in various fields that can make the most of its thermosensitivity. For example, the thermosensitive copolymer may be utilized in a drug delivery system (DDS).

Another example embodiment provides a method of producing a thermosensitive copolymer that includes a first repeating unit having a temperature sensitive oligomer grafted thereto and a second repeating unit having an ionic moiety and a counter ion to the ionic moiety. The method may include preparing polysuccinimide; preparing a temperature-sensitive oligomer having an amine group or a thiol group at one end and including a repeating unit derived from a monomer represented by Chemical Formula 3, or a temperature-sensitive oligomer having an amine group or a thiol group at one end and including a repeating unit derived from a monomer represented by Chemical Formula 4, a repeating unit derived from a monomer represented by Chemical Formula 5, or a combination thereof,

[Chemical Formula 3]

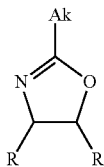

wherein, in Chemical Formula 3, Ak is a linear or branched C1 to C10 alkyl group, and each R is independently hydrogen or a C1 to C3 alkyl group;

[Chemical Formula 4]

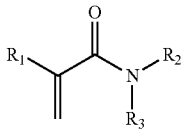

wherein, in Chemical Formula 4, $R_1$ is hydrogen or methyl, $R_2$ and $R_3$ are each independently hydrogen or a linear or branched C1 to C6 alkyl group, a C3 to C7 cycloalkyl group, or a C6 to C10 aryl group, $R_2$ and $R_3$ may not both be hydrogen, and $R_2$ and $R_3$ may be combined to form a nitrogen containing heterocycle,

[Chemical Formula 5]

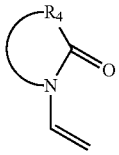

wherein, in Chemical Formula 5, $R_4$ is a C2 to C5 alkylene group; subjecting the polysuccinimide to a reaction with the temperature-sensitive oligomer to open parts of succinimide rings in the polysuccinimide and to graft the temperature-sensitive oligomer thereto; and subjecting the reaction product to a reaction with an amine compound having an ionic moiety, a thiol compound having an ionic moiety, an inorganic base, or a combination thereof to open the remaining succinimide rings in the polysuccinimide and to introduce the ionic moiety and counter ion.

The polysuccinimide may have a number average molecular weight of about 1,000 to about 25,000, but it is not limited thereto. In an example embodiment, the polysuccinimide may have a number average molecular weight of equal to or less than 5,000. The polysuccinimide having such molecular weight may be prepared by any suitable methods known in the art.

Details for the thermosensitive oligomers/copolymers may be the same as those set forth in the above description. The oligomers may be an N-alkyl(meth)acrylamide oligomer, a co-oligomer of an N-alkyl(meth)acrylamide and (meth)acrylamide, an N-vinyl lactam oligomer, a 2-(alkyl)-2-oxazoline oligomer, or a combination thereof. Specific examples for the oligomers may include, but are not limited to, an N-isopropyl acryl amide oligomer, a co-oligomer of N-isopropyl acryl amide-(meth)acryl amide, an N,N-diethylacryl amide oligomer, an N-vinyl caprolactam oligomer, and a 2-isopropyl-2-oxazoline oligomer. The oligomer includes an amine group or a thiol group at one end. The amine or thiol group may trigger a ring opening reaction of the succinimide rings. The amine or thiol group may be derived from a chain transferring agent being used for the preparation of the oligomer. Alternatively, the amine or thiol group may be introduced by subjecting the oligomer to a suitable chemical reaction.

The reaction to open the succinimide rings in the polysuccinimide with the oligomer (i.e., the ring-opening reaction) may be carried out in a solution prepared by dissolving a predetermined amount of the polysuccinimide and a predetermined amount of the temperature-sensitive oligomer. The ratio between the amount of the polysuccinimide and the amount of the oligomer may be controlled so as to obtain a desired mole ratio between the first repeating unit and the second repeating unit in the thermosensitive copolymer. The types of the solvent are not particularly limited so long as the solvent may dissolve the polysuccinimide and the oligomer without triggering a side reaction with the amine or thiol group. Specific examples of the solvent may include, but are not limited to, N,N-dimethylformamide (DMF), dimethyl sulfoxide (DMSO), and dimethylacetamide. The temperature and the time for the ring opening reaction are not particularly limited, and may be appropriately selected. For example, the ring opening reaction may be carried out at a temperature of about 50° C. to about 100° C., specifically about 60° C. to about 90° C., and more specifically about 70° C. to about 80° C., for about 3 hours to about 72 hours. The ring opening reaction may be conducted in the presence of triethyl amine, triethanol amine, pyridine, or a combination thereof. Through such ring opening reaction, the temperature sensitive oligomer may be grafted onto the main chain of the polymer and the graft ratio may be controlled by changing the amount of the polysuccinimide and the amount of the temperature-sensitive oligomer.

The product of the ring-opening reaction may further react with an amine compound including the ionic moiety, the thiol compound including the ionic moiety, the inorganic base, or a combination thereof to open the remaining succinimide rings in the polysuccinimide and to introduce the ionic moiety and the counter ion to the polymer. Specific examples of the amine compound may include, but are not limited to, a phosphoalkylamine such as ortho-phosphoethanol amine and a C1 to C20 sulfoalkyl amine such as aminoethane sulfonic acid. Specific examples of the inorganic base may include, but are not limited to, an alkali metal hydroxide such as NaOH, KOH, and LiOH, and an alkaline earth metal hydroxide such as $Ca(OH)_2$, $Mg(OH)_2$, and $Ba(OH)_2$.

The thermosensitive copolymer may be used as an osmosis draw solute in a forward osmosis water treatment. Details of the thermosensitive copolymer may be the same as those set forth in the above description. The forward osmosis water treatment process involves using an osmosis draw solution having a higher concentration than that of a feed solution to move water molecules from the feed solution to the osmosis draw solution and separating the draw solute from the resulting osmosis draw solution to produce fresh water. The separated draw solute may be reused. The forward osmosis water treatment may be operated at a lower cost than a pressure-driven process such as the reverse osmosis water treatment, but its development has been hindered by the unavailability of suitable draw solutions. The thermosensitive copolymer having the aforementioned structure may generate high osmotic pressure in an aqueous solution. That is, the thermosensitive copolymer includes the first repeating unit having the temperature sensitive oligomer grafted thereon and the second repeating unit having the ionic moiety and the counter ion and thus it may have high water solubility at a temperature below the LCST to prepare an osmosis draw solution with a high concentration, generating high osmotic pressure. Meanwhile, the thermosensitive copolymer exhibits a noticeable solubility change below and above the lower critical solution temperature so that it may be easily recovered by means of changing its temperature, making it possible to reduce energy consumption necessary for removing the polymer (i.e., the solute). Moreover, it has a higher molecular weight than other draw solutes, effectively inhibiting the reverse draw solute diffusion. The copolymer may be aggregated and precipitated at a temperature higher than or equal to the LCST, facilitating the separation and the recovery of the solute from the draw solution. Cooling the separated copolymer below the LCST causes the disintegration of the aggregated copolymer particle, leading to a rapid increase in the water solubility of the copolymer and making it possible to reuse the copolymer as the draw solute. In addition, the copolymer may have a polyamino acid main chain and includes the ionic moiety/the counter ion so that it may be biodegradable and bio-compatible, showing a low level of bio-toxicity. Therefore, the thermosensitive copolymer may be suitable for a draw solute to produce drinking water or water for living. For example, the thermosensitive copolymer shows no bio-toxicity, for example, up to about 3,000 ppm even when it has a relatively high molecular weight.

An osmotic draw solution may include an aqueous medium; and a draw solute being dissolved in the aqueous medium, wherein the draw solute includes a thermosensitive copolymer having a osmotic pressure-inducing polymer chain that includes an ionic moiety and a counter ion to the ionic moiety and having a temperature-sensitive oligomer covalently bonded onto the osmotic pressure-inducing polymer in a graft form and the draw solute is recoverable by phase separation at a temperature greater than or equal to a lower critical solution temperature.

The aqueous medium may be water. Details for the thermosensitive copolymer may be the same as those set forth in the above description. By way of an example, the thermosensitive copolymer may have a lower critical solution temperature (LCST) of about 10 to about 50° C. at a concentration of 0.01 g/ml. The thermosensitive copolymer may have solubility in water of greater than or equal to about 100 g/L at a temperature below the lower critical solution temperature (LCST), and solubility in water of less than or equal to about 1 g/L at a temperature of greater than or equal to the lower critical solution temperature (LCST). When a temperature of the draw solution increases from a temperature lower than the LCST to a temperature higher than the LCST, about 50 wt % or more of a total of the draw solute may exhibit an increase by at least about 10 times in an aggregate size.

The temperature-sensitive oligomer may include an amide group and a aliphatic moiety being covalently bonded to a nitrogen atom of the amide group and being more hydrophobic than the amide group, wherein the aliphatic moiety is an oligomer either being covalently bonded with an carbon atom of the amide group or not being bonded therewith, or an oligomer including a repeating unit derived from a heterocyclic compound having C, N, and O and having a C=N bond in its ring. The aliphatic moiety may be, for example, a linear, a branched, or a cyclic alkyl group.

According to another example embodiment, a forward osmosis water treatment device may include a draw solution containing the aforementioned thermosensitive copolymer. The forward osmosis water treatment device may include a feed solution including water and materials to be separated being dissolved in water; the aforementioned osmosis draw solution; a semi-permeable membrane contacting the feed solution on one side and the osmosis draw solution on the other side; a recovery system for removing the thermosensitive copolymer from a treated solution including water that moves from the feed solution to the osmosis draw solution through the semipermeable membrane by osmotic pressure; and a connector for reintroducing the thermosensitive copolymer removed from the recovery system to the osmosis draw solution. FIG. 1 shows a schematic view of a forward osmosis water treatment device according to an example embodiment that may be operated by the forward osmosis water treatment method that will be explained hereinafter.

The semi-permeable membrane is permeable to water and non-permeable to the materials to be separated. The types of the feed solution are not particularly limited as long as they may be treated in the forward osmosis manner. The materials to be separated may be impurities. Specific examples of the feed solution may include, but are not limited to, sea water, brackish water, ground water, waste water, and the like. By way of a non-limiting example, the forward osmosis water treatment device may treat sea water to produce drinking water.

Details for the thermosensitive copolymer may be the same as those set forth in the above description. The concentration of the osmosis draw solution may be controlled to generate higher osmotic pressure than that of the feed solution. By way of an example, some of the aforementioned thermosensitive copolymers may generate osmotic pressure of at least 40 atm with respect to a feed solution to be treated when they are dissolved at a concentration as high as about 10 wt % (even at a concentration of 0.01 g/ml or 0.02 g/ml). In another case, the thermosensitive copolymer may generate an osmotic pressure of at least 80 atm with respect to a given feed solution when it is dissolved at a concentration as high as about 20 wt %. The concentration of the osmosis draw solution and the osmotic pressure generated therefrom may vary with the structure of the copolymer, the types of the feed solution, and the like. For example, desalination of sea water may require an osmotic pressure of at least about 26 atm, or specifically at least about 50 atm. For other examples, purification of waste water may require a relatively low osmotic pressure of about 10 atm to about 20 atm, and an osmosis draw solution having a concentration of about 2 wt % or lower may also be used. In some embodiments, the thermosensitive copolymer may generate a high level of osmotic pressure even at a very low concentration (e.g., 50 atm or higher at a concentration of 0.02 g/ml), and it may exhibit a low phase separation temperature even at such a low concentration, making it possible to prepare an ideal draw solution.

In the recovery system, the removal of the thermosensitive copolymer may utilize the thermosensitivity of the copolymer. The recovery system may be provided with a temperature controller to heat the treated solution to a temperature higher than or equal to the lower critical solution temperature. Such heating allows the copolymer to be self-aggregated and to form particles of increased sizes, which are easily filtered and separated. Specific examples of the temperature controller may be, but are not limited to, a heating unit such as a heating jacket. In non-limiting examples, the temperature controller may be an apparatus using waste heat from an industrial water heat source such as a waste water treatment plant, a power plant, and a distillation plant. The recovery system may include a microfiltration (MF) membrane, an ultrafiltration (UF) membrane, a nanofiltration (NF) membrane, or a centrifuge for filtration or separation of the aggregated copolymer. The nanofiltration membrane may be a loose nanofiltration membrane. In some non-limiting examples, the heating causes the copolymer to form micro-scale particles having micelle networks, which are easily separated even with using a microfiltration membrane, and thereby the energy necessary for the solute recovery may be greatly reduced. The copolymer as removed may be introduced into the draw solution again via the connector. The recovery system may include a temperature controller for cooling the copolymer as removed to below the lower critical solution temperature (LCST). Specific examples of such temperature controller may include, but are not limited to, a cooling unit such as a cooling jacket. The copolymer cooled below the LCST may have high solubility in water and may thus be reused as the draw solute.

The forward osmosis water treatment device may further include an outlet for discharging treated water produced by removing the thermosensitive copolymer from the treated solution in the recovery system. The types of the outlet are not particularly limited.

In the forward osmosis water treatment device, the forward osmosis process is conducted at a temperature below the LCST and the treated solution produced from the forward osmosis process is heated to a temperature higher than or equal to the LCST to easily separate and recover the thermosensitive copolymer (i.e., the draw solute). In particular, the copolymer may have a lower critical solution temperature ranging from about 10° C. to 50° C., and thus no high-temperature condition is necessary for the recovery of the draw solute, which may reduce the operation energy for the device. Moreover, the thermosensitive copolymer separated from the recovery system may be cooled below the LCST and then used again as a draw solute.

In yet another example embodiment, a forward osmosis method for water treatment may include contacting a feed solution including water and materials to be separated being dissolved in water and the aforementioned osmosis draw solution with a semi-permeable membrane positioned therebetween to obtain a treated solution including water that moves from the feed solution to the draw solution through the semi-permeable membrane by osmotic pressure; heating at least a portion of the treated solution to a temperature higher than or equal to the lower critical solution temperature (LCST) of the thermosensitive copolymer to cause aggregation of the thermosensitive copolymer in the treated solution; and removing the aggregated thermosensitive copolymer from the treated solution to obtain treated water. The treated water may be discharged via an appropriate means.

When the feed solution and the draw solution are brought into contact with the semipermeable membrane disposed therebetween, water in the feed solution is driven to move through the semi-permeable membrane into the osmosis draw solution by osmotic pressure.

The thermosensitive copolymer, the semi-permeable membrane, the forward osmosis process, the heating/cooling of the copolymer, and the aggregation of the copolymer may be the same as those set forth in the above description.

The forward osmosis method for water treatment may further include cooling the thermosensitive copolymer as removed to below a temperature of its lower critical solution temperature (LCST) and reintroducing it into the osmosis draw solution contacting the semi-permeable membrane. The lower critical solution temperature (LCST) may range from about 10 to about 50° C.

EXAMPLE

Example 1

A copolymer of the following Chemical Formula 11 is synthesized via Reaction Scheme 1.

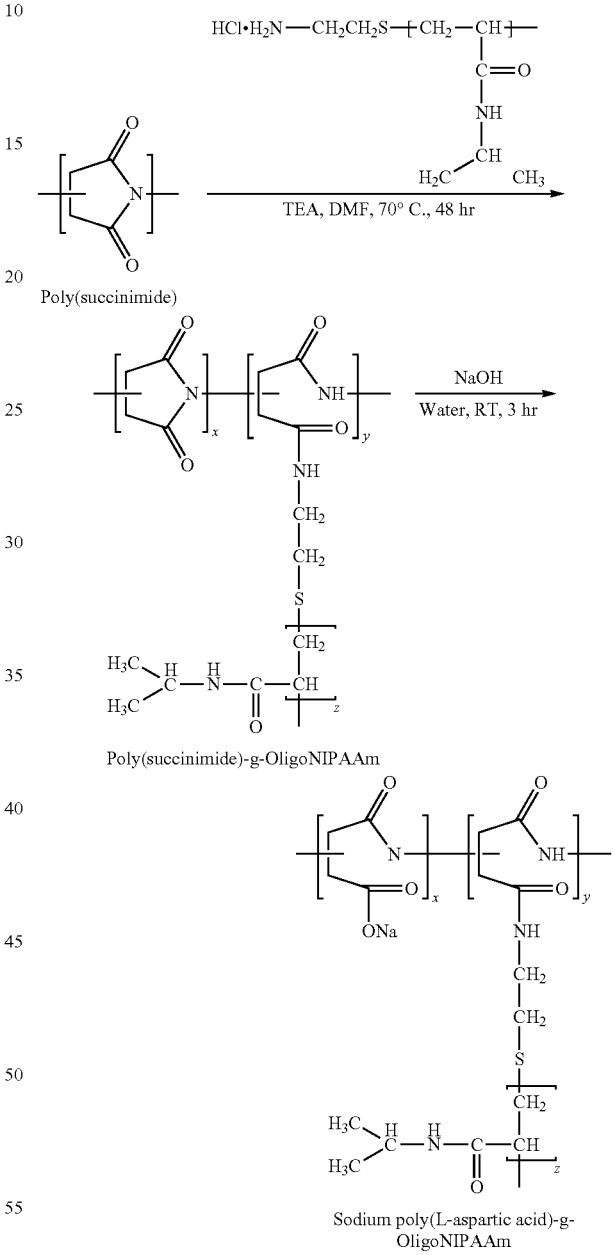

1) Synthesis of NIPAAm Oligomer

An N-isopropylacrylamide oligomer (oligo-NIPAAm) represented by the following Chemical Formula 10 is synthesized via radical polymerization. 5.8 g (51.2 mmol) of a NIPAAm monomer, 0.175 g (1.53 mmol) of aminoethanethiol hydrochloride (AET-HCl) as a chain transfer agent, and 0.084 g (0.51 mmol) of azobisisobutyronitrile (AIBN) as an initiator are dissolved in 30 ml of dimethylformamide (DMF) and reacted at 72° C. under nitrogen atmosphere for 15 hours. A polymerized NIPAAm oligomer is precipitated in diethylether, centrifuged, and dried in a vacuum oven for one day.

[Chemical Formula 10]

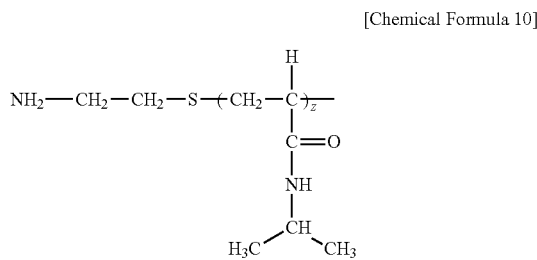

In the above Chemical Formula 10, z is the degree of polymerization and is 18-25 as calculated by an end group analysis through $^1$H-NMR.

Figure 2:
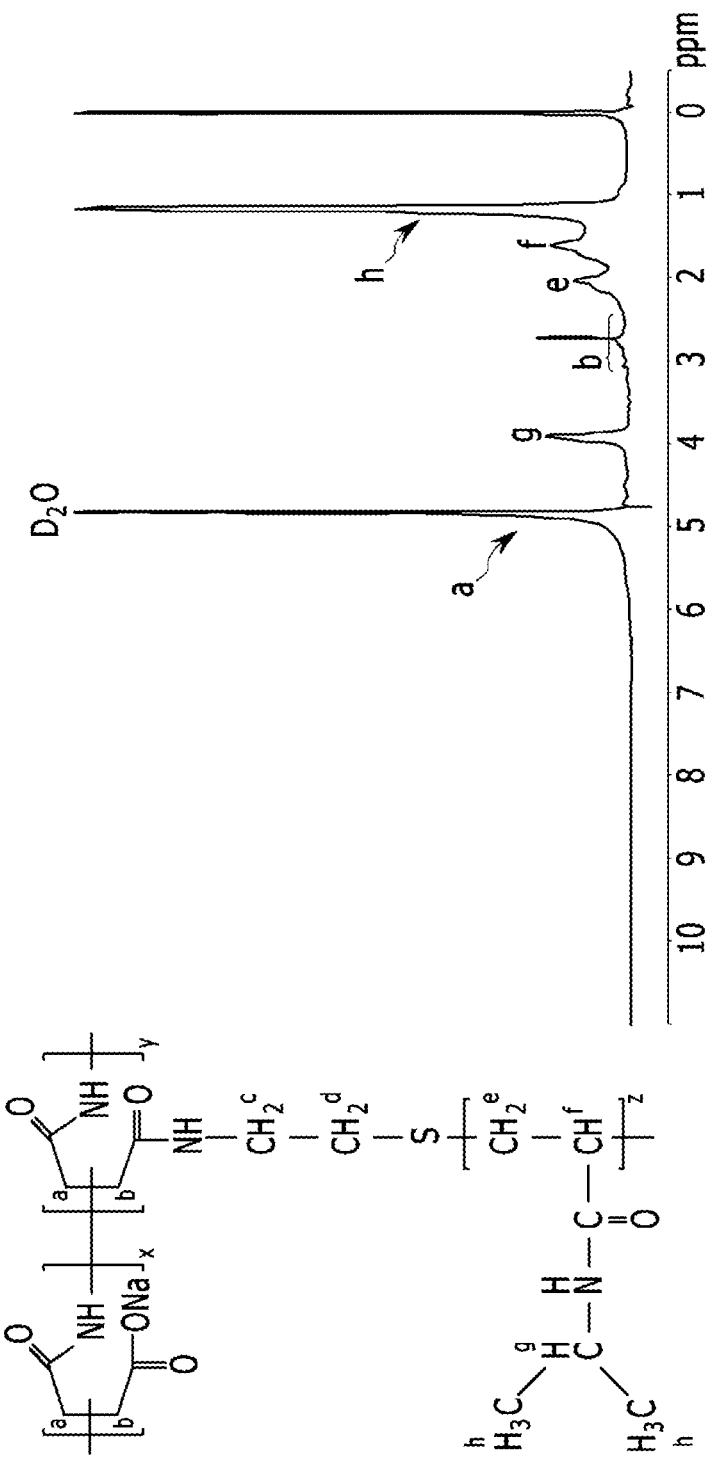
FIG. 2 is a $^1$H-NMR analysis spectrum of the copolymer synthesized in Example 1.

2) Synthesis of Thermosensitive Copolymer 0.97 g (10 mmol when being calculated with respect to the succinimide ring) of polysuccinimide (PSI) (as prepared by condensation polymerization of L-aspartic acid in the presence of a catalyst (i.e., phosphoric acid), number average molecular weight: 18,000) and 2.5 g (1 mmol) of the NIPAAm oligomer represented by Chemical Formula 10 are reacted in a DMF solvent in the presence of 0.28 mL (2 mmol) of triethyl amine at 70° C. for 48 hours. The reaction product is added to a 1 M NaOH solution and stirred to open all of the succinimide rings remaining therein. The reacted solution is dialyzed against methanol for 48 hours, and then against water for 48 hours, to produce a liquid product, which is then subjected to a freeze-drying to obtain a powder product. The NMR results of the product confirm that the resulting product is a copolymer represented by the following Chemical Formula 11. FIG. 2 is a $^1$H-NMR spectrum of the copolymer as synthesized in Example 1.

[Chemical Formula 11]

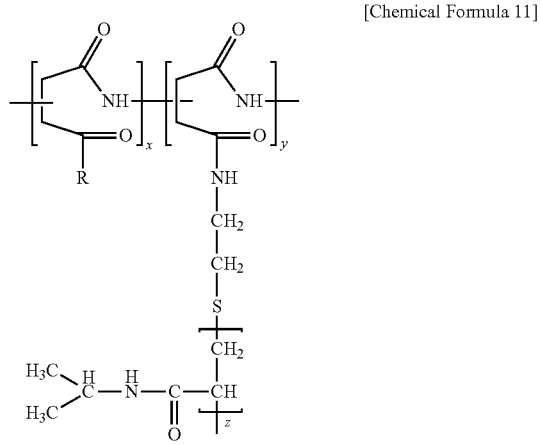

In Chemical Formula 11, R is —ONa, x is a polymerization degree of the second repeating unit including an ionic moiety, y is a polymerization degree of the first repeating unit having the NIPAAm oligomer grafted thereto, and z is the degree of polymerization of the NIPAAm oligomer, 18-25.

In the thermosensitive copolymer, the content of the first repeating unit is 10 mol % and the content of the second repeating unit is 90 mol %. The copolymer has a number average molecular weight of 26,400 g/mol as determined by GPC and $^1$H-NMR.

Example 2

A thermosensitive copolymer is synthesized in the same manner as set forth in Example 1, except for using 0.97 g (10 mmol) of PSI (as synthesized, number average molecular weight: 18,000) and 10 g (4 mmol) of the NIPAAm oligomer represented by Chemical Formula 10. In the thermosensitive copolymer, the content of the first repeating unit is 40 mol % and the content of the second repeating unit is 60 mol %. The copolymer has a number average molecular weight of 127,800 g/mol as determined by GPC and $^1$H-NMR.

Example 3

A thermosensitive copolymer is synthesized in the same manner as set forth in Example 1 except for using 0.97 g (10 mmol) of PSI (purchased from Bayer Co. Ltd., number average molecular weight: 2,000 to 3,000) and 0.5 g (0.2 mmol) of the NIPAAm oligomer represented by Chemical Formula 10. In the thermosensitive copolymer, the content of the first repeating unit is 2 mol % and the content of the second repeating unit is 98 mol %. The copolymer has a number average molecular weight of 6,527 g/mol as determined by GPC and $^1$H-NMR.

Example 4

A thermosensitive copolymer is synthesized in the same manner as set forth in Example 1 except for using 0.97 g (10 mmol) of PSI (purchased from Bayer Co. Ltd., number average molecular weight: 2,000 to 3,000) and 1 g (0.4 mmol) of the NIPAAm oligomer represented by Chemical Formula 10. In the thermosensitive copolymer, the content of the first repeating unit is 4 mol % and the content of the second repeating unit is 96 mol %. The copolymer has a number average molecular weight of 8,123 g/mol as determined by GPC and $^1$H-NMR.

Example 5

A thermosensitive copolymer is synthesized in the same manner as set forth in Example 1 except for using 0.97 g (10 mmol) of PSI (as synthesized, number average molecular weight: 18,000) and 0.5 g (0.2 mmol) of the NIPAAm oligomer represented by Chemical Formula 10. In the thermosensitive copolymer, the content of the first repeating unit is 2 mol % and the content of the second repeating unit is 98 mol %. The copolymer has a number average molecular weight of 20,678 g/mol as determined by GPC and $^1$H-NMR.

Example 6

A thermosensitive copolymer is synthesized in the same manner as set forth in Example 1, except for using 0.97 g (10 mmol) of PSI (as synthesized, number average molecular weight: 18,000) and 1 g (0.4 mmol) of the NIPAAm oligomer represented by Chemical Formula 10. In the thermosensitive copolymer, the content of the first repeating unit is 4 mol % and the content of the second repeating unit is 96 mol %. The copolymer has a number average molecular weight of 23,625 g/mol as determined by GPC and $^1$H-NMR.

Example 7

A thermosensitive copolymer is synthesized in the same manner as set forth in Example 1 except for using 0.97 g (10 mmol) of PSI (as synthesized, number average molecular weight: 18,000) and 1.5 g (0.6 mmol) of the NIPAAm oligomer represented by Chemical Formula 10. In the thermosensitive copolymer, the content of the first repeating unit is 6 mol % and the content of the second repeating unit is 94 mol %. The copolymer has a number average molecular weight of 25,591 g/mol as determined by GPC and $^1$H-NMR.

Example 8

A thermosensitive copolymer is synthesized in the same manner as set forth in Example 1 except for using 0.97 g (10 mmol) of PSI (as synthesized, number average molecular weight: 18,000) and 2 g (0.8 mmol) of the NIPAAm oligomer represented by Chemical Formula 10. In the thermosensitive copolymer, the content of the first repeating unit is 8 mol % and the content of the second repeating unit is 92 mol %. The copolymer has a number average molecular weight of 29,029 g/mol as determined by GPC and $^1$H-NMR.

Example 9

[Reaction Scheme 2]

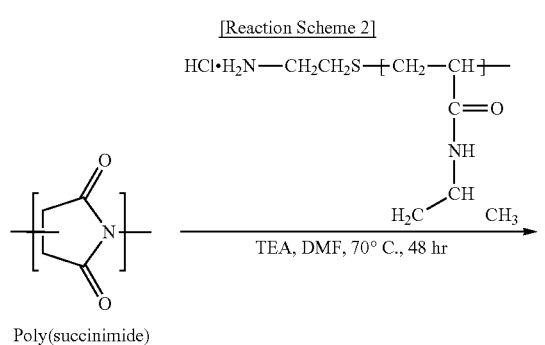

Poly(succinimide)

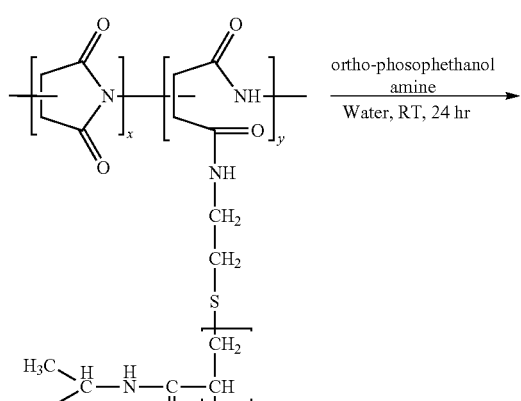

Poly(succinimide)-g-OligoNIPAAm

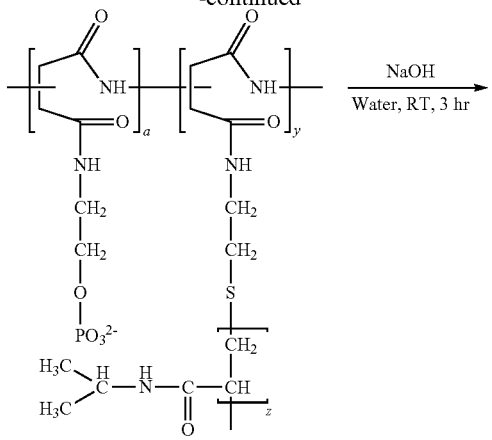

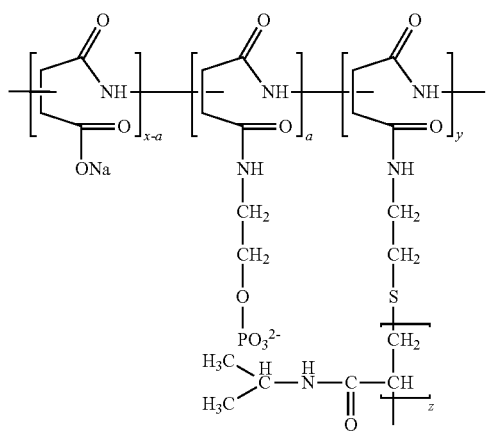

Sodium poly(L-aspartic acid)-g-OligoNIPAAm having phosphate moiety

A NIPAAm oligomer represented by the above Chemical Formula 10 is synthesized in the same manner as set forth in Example 1.

2) Synthesis of Thermosensitive Copolymer 0.97 g (10 mmol) of polysuccinimide (PSI) (purchased from Bayer Co., Ltd., number average molecular weight: 2,000 to 3,000) and 2.5 g (1 mmol) of the NIPAAm oligomer represented by Chemical Formula 10 are reacted in a DMF solvent in the presence of 0.28 mL (2 mmol) of triethyl amine at 70° C. for 48 hours. The reaction product is dissolved in 4.85 ml of DMF, and 0.14 g (0.1 equiv. with respect to the remaining succinimide rings) of ortho-phosphoethanol amine is added thereto, and the resulting mixture is reacted while stirring for 24 hours. The resulting product is added to a 1M NaOH solution (1.2 equiv. with respect to the remaining succinimide rings) and vigorously stirred at room temperature for 3 hours to open all of the imide rings remaining therein. The reacted solution is dialyzed against methanol for 48 hours, and then water for 48 hours to produce a liquid product, which is then subjected to freeze-drying to obtain a powder product. The NMR results of the resulting product confirm that it is a copolymer represented by the following Chemical Formula 12.

[Chemical Formula 12]

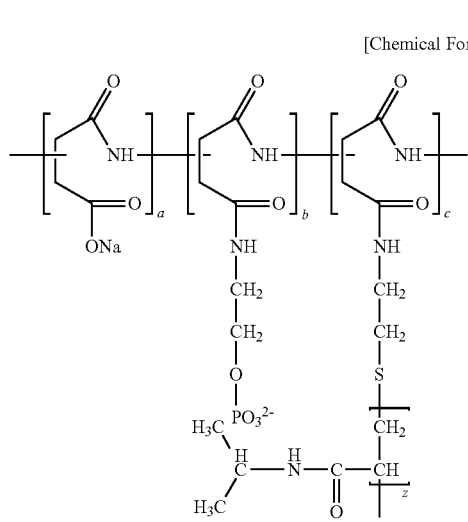

In the copolymer, the content of the first repeating unit is 2 mol % and the content of the second repeating unit is 98 mol %. The mole ratio between COO⁻ and $PO_3^{2-}$ (COO⁻: $PO_3^{2-}$) is 9:1. The number average molecular weight of the copolymer is about 12,900.

Example 10

A thermosensitive copolymer represented by Chemical Formula 12 is synthesized in the same manner as set forth in Example 9, except for using an aqueous solution of 0.41 g of ortho-phosphoethanol amine (0.3 equiv. with respect to the remaining succinimide rings). In the thermosensitive copolymer, the content of the first repeating unit is 2 mol % and the content of the second repeating unit is 98 mol %. The mole ratio between COO⁻ and $PO_3^{2-}$ (COO⁻:$PO_3^{2-}$) is 7:3. The number average molecular weight of the copolymer is about 13,000.

Example 11

A thermosensitive copolymer represented by the following Chemical Formula 13 is synthesized in the same manner as set forth in Example 9, except that 0.12 g (0.1 equiv. with respect to the remaining succinimide rings) of aminoethane sulfonic acid instead of ortho-phosphoethanol amine is used and the reaction is conducted at 25° C. for 24 hours. In the thermosensitive copolymer, the content of the first repeating unit is 2 mol % and the content of the second repeating unit is 98 mol %. The mole ratio between COO⁻ and $SO_3^-$ (COO⁻:$SO_3^-$) is 9:1. The number average molecular weight of the copolymer is about 12,900.

[Chemical Formula 13]

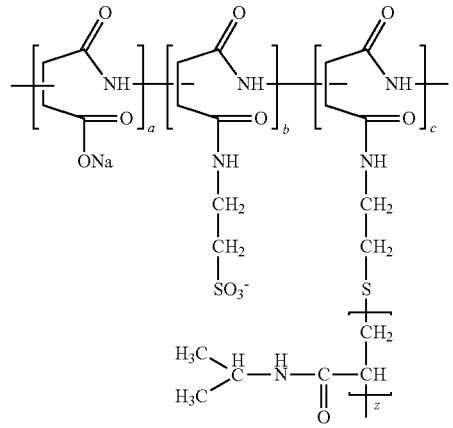

Example 12

A thermosensitive copolymer represented by the following Chemical Formula 13 is synthesized in the same manner as set forth in Example 9 except that an aqueous solution of 0.37 g (0.3 equiv. with respect to the remaining succinimide rings) of aminoethane sulfonic acid instead of ortho-phosphoethanol amine is used and the reaction is conducted at 25° C. for 24 hours. In the thermosensitive copolymer, the content of the first repeating unit is 2 mol % and the content of the second repeating unit is 98 mol %. The mole ratio between COO⁻ and $SO_3^-$ (COO⁻:$SO_3^-$) is 7:3. The number average molecular weight of the copolymer is 12,900.

Comparative/Reference Example 1

0.97 g (10 mmol) of polysuccinimide (PSI) (purchased from Bayer Co., Ltd., number average molecular weight: 2000-3000) is added to 1M NaOH solution and stirred for 3 hours. The reaction product is precipitated in methanol, and then is subjected to centrifuge and vacuum-drying to prepare a polyaminoacid represented by Chemical Formula 11 (wherein y is 0).

Comparative/Reference Example 2

A polyamino acid of Chemical Formula 11 (wherein, y is 0) is prepared in the same manner as set forth in Reference Example 1, except for using 0.97 g (10 mmol) of polysuccinimide (PSI) (as synthesized, number average molecular weight: 18,000).

Experimental Example 1

Preparation of Osmosis Draw Solution and Analysis of Osmotic Pressure Thereof

The copolymers synthesized in Examples 1 to 12 and the polymers of Reference Examples 1 and 2 are used to prepare osmosis draw solutions with various concentrations as set forth in the following tables. Osmotic pressure of each draw solution is measured by using osmotic pressure measurement equipment (Osmomat090, Gonotek) in accordance with the membrane measurement method. Results are compiled in Tables 1 to 4.

TABLE 1

| Reference Example 1 | | Example 1 | | Example 2 | |
|---|---|---|---|---|---|
| Conc. [g/ml] | Osmotic pressure [atm] | Conc. [g/ml] | Osmotic pressure [atm] | Conc. [g/ml] | Osmotic pressure [atm] |
| 0.025 | 0.58 | 0.05 | 1.06 | 0.1 | 1.2 |
| 0.05 | 1.24 | 0.1 | 1.74 | 0.3 | 4.2 |
| 0.1 | 2.87 | 0.2 | 3.76 | 0.5 | 7.4 |

Figure 3:
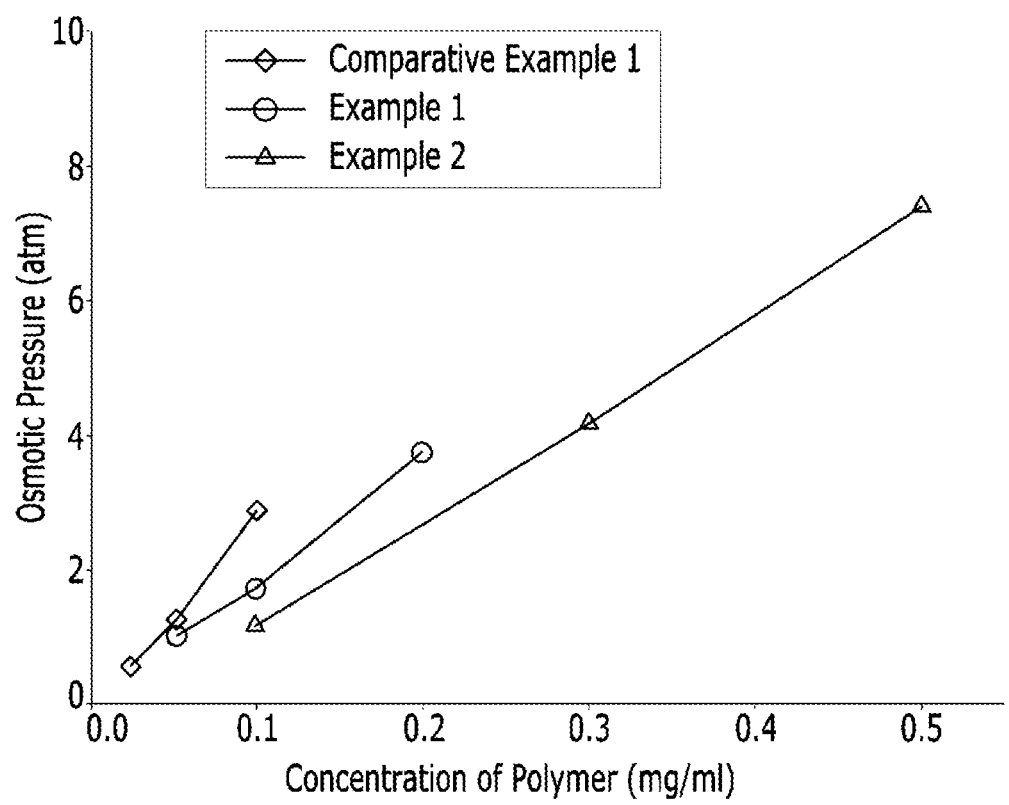
FIG. 3 is a graph plotting the changes in the osmotic pressure according to the concentration of the solutions including the copolymer of Example 1, the copolymer of Example 2, and the copolymer of Comparative/Reference Example 1.

FIG. 3 illustrates the results of Table 1 as a graph. The results of Table 1 confirm that the copolymers of Example 1 and Example 2 may have higher osmotic pressure as the concentration increases.

TABLE 2

| | Reference Example 1 OAspNa | | Example 3 OAspNa-ON2% | | Example 4 OAspNa-ON4% | |
|---|---|---|---|---|---|---|
| Sample Conc. [g/ml] | Average [atm] | Standard deviation | Sample Conc. [g/ml] | Average [atm] | Average [atm] | Standard deviation |
| 0.4 | 41.574 | 1.68 | 0.25 | 24.631 | 0.979 29.1 | 0.831 |
| 0.375 | 37.0205 | 1.4 | 0.125 | 9.66 | 0.593 11.6 | 0.45 |
| 0.25 | 19.8502 | 0.73 | 0.0625 | 4.57 | 0.37 5.489 | 0.21 |
| 0.205 | 14.7349 | 0.66 | | | | |
| 0.164 | 11.1835 | 0.45 | | | | |
| 0.125 | 9.359 | 0.37 | | | | |
| 0.1 | 7.567 | 0.342 | | | | |
| 0.05 | 3.9342 | 0.14 | | | | |

TABLE 3

| Substance Mole Conc. [M] | Reference Example 2 | | | Example 5 | | | Example 6 | | |
|---|---|---|---|---|---|---|---|---|---|
| | Conc. [g/ml] | Avg | STD | Conc. [g/ml] | Avg | STD | Conc. [g/ml] | Avg | STD |
| 1.00E−03 | | | | 0.020678 | 58 | 0.1 | 0.023625 | 66 | 0.1 |
| 5.00E−04 | 0.0091111 | | | 0.010339 | 26 | 0.2 | 0.011813 | 30 | 0.3 |
| 2.5E−04 | 0.004555 | 84 | 7.4 | 0.00517 | 11 | 0.2 | 0.005906 | 12 | 0.3 |
| 1.25E−04 | 0.002278 | 42 | 0.2 | 0.002585 | 4 | 0.1 | 0.002953 | 5 | 0.1 |
| 6.25E−05 | 0.001139 | 18 | 0.1 | 0.001292 | 2 | 0.0 | 0.001477 | 2 | 0.0 |
| 3.13E−05 | 0.000569 | 8 | 0.2 | 0.000646 | 1 | 0.1 | 0.000738 | 1 | 0.1 |

| Substance Mole Conc. [M] | Example 7 | | | Example 8 | | |
|---|---|---|---|---|---|---|
| | Conc. [g/ml] | Avg | STD | Conc. [g/ml] | Avg | STD |
| 1.00E−03 | 0.025591 | 71 | 0.1 | 0.02903 | 81 | 0.1 |
| 5.00E−04 | 0.012796 | 33 | 0.3 | 0.014545 | 37 | 0.3 |
| 2.5E−04 | 0.006398 | 13 | 0.3 | 0.007258 | 15 | 0.3 |
| 1.25E−04 | 0.003199 | 5 | 0.1 | 0.003629 | 6 | 0.1 |
| 6.25E−05 | 0.001599 | 2 | 0.0 | 0.001814 | 3 | 0 |
| 3.13E−05 | 0.0008 | 1 | 0.1 | 0.000907 | 1 | 0.1 |

TABLE 4

| Sample Mole Conc. [M] | Example 9 | | Example 10 | | Example 11 | | Example 12 | |
|---|---|---|---|---|---|---|---|---|
| | Avg. | STD | Avg. | STD | Avg. | STD | Avg. | STD |
| 5.00E−04 | 21.026 | 0.197 | 27.026 | 0.253 | 14.718 | 0.138 | 18.918 | 0.177 |
| 2.50E−04 | 8.419 | 0.180 | 10.822 | 0.232 | 5.894 | 0.126 | 7.575 | 0.162 |
| 1.25E−04 | 3.515 | 0.044 | 4.518 | 0.056 | 2.460 | 0.031 | 3.162 | 0.039 |
| 6.25E−05 | 1.467 | 0.008 | 1.886 | 0.011 | 1.027 | 0.006 | 1.320 | 0.007 |
| 3.13E−05 | 0.822 | 0.075 | 1.056 | 0.097 | 0.575 | 0.053 | 0.739 | 0.068 |

Conc. concentration

Avg. average [atm]

STD standard deviation

The results of Tables 1 to 4 confirm that the copolymers of Examples 1 to 12 may generate osmotic pressure as high as 50 atm or higher depending on the specific composition of the copolymer (e.g., the molecular weight of the polysuccinimide, the graft ratio of the oligoNIPAAm, etc.) and the concentration of the polymer when they are prepared as an aqueous solution.

Experimental Example 2

Determination of Lower Critical Solution Temperature

Figure 4:
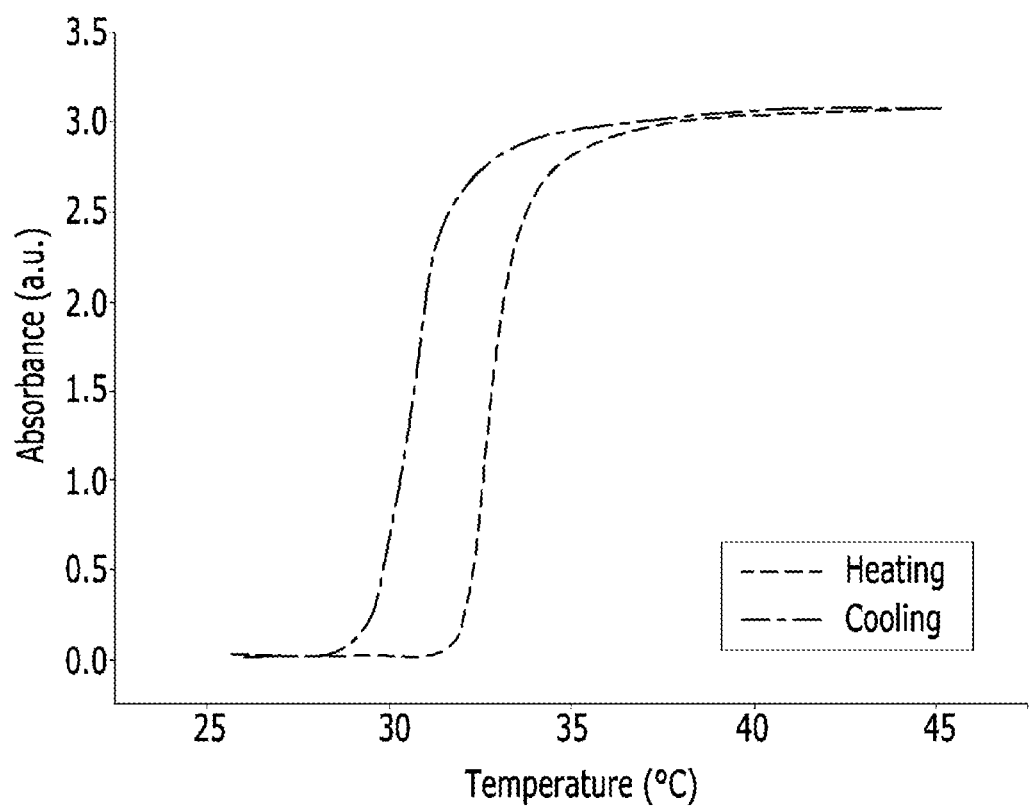
FIG. 4 is a graph plotting the light absorbance (at a wavelength of 500 nm) according to the temperature of the osmosis draw solution including the copolymer of Example 1.
Figure 5:
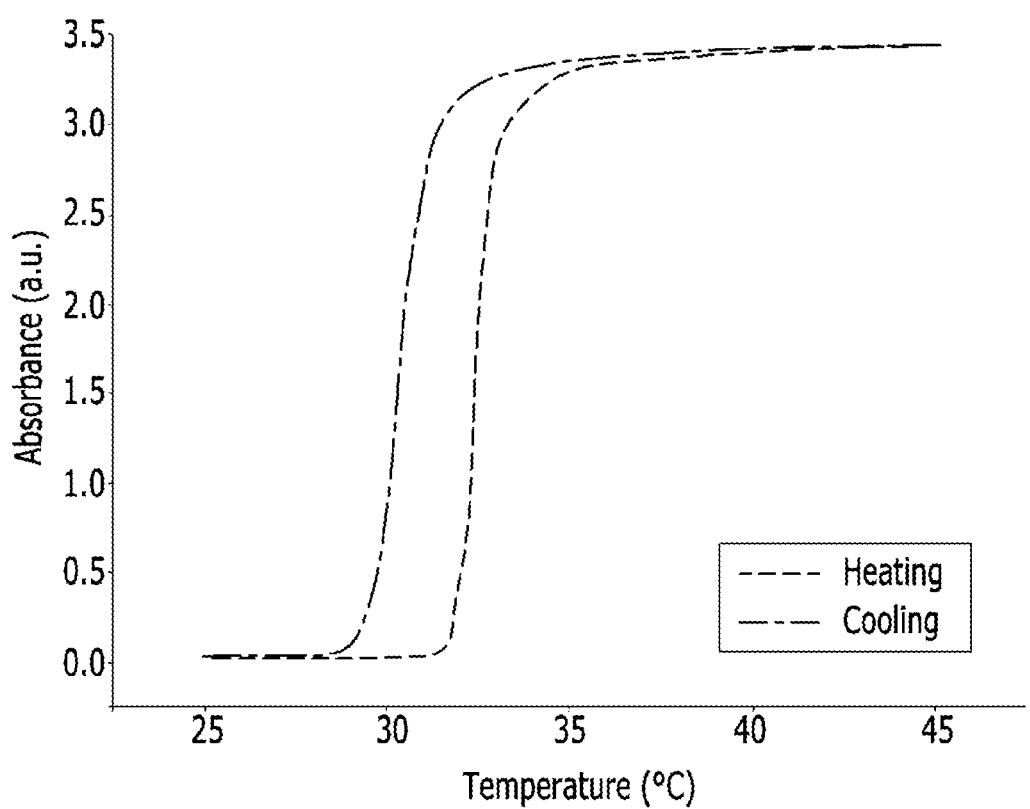
FIG. 5 is a graph plotting the light absorbance (at a wavelength of 500 nm) according to the temperature of the osmosis draw solution including the copolymer of Example 2.

An osmosis draw solution with a concentration of 0.01 g/ml is prepared by using the copolymers of Example 1 and Example 2, respectively. While slowly heating the osmosis draw solutions from room temperature and then cooling the same back to room temperature, the solubility changes are monitored by measuring the absorbance of the solution at a wavelength of visible light (i.e., 500 nm). FIG. 4 shows the results for the copolymer of Example 1, and FIG. 5 shows the results for the copolymer of Example 2. The lower critical solution temperature is set as the temperature at which the absorbance reaches 90% of its saturated value as the temperature increases. The results are compiled in Table 5.

TABLE 5

|  | Example 1 | Example 2 |
| --- | --- | --- |
| LCST (° C.) | 32-35° C. | 32-35° C. |
| 0.45 μm filter separation | Separated | Separated |
| Reversibility (at 25° C.) | ○ | ○ |

The copolymers of Example 1 and Example 2 show a phase separation temperature at about 32° C. which is a similar value to that of oligo-NIPAAm. The graphs show hysteresis both in the heating and the cooling cycles, which is presumably due to the structural limitations of the analysis equipments. That is, the solution may not be uniformly stirred during the measurement in the equipment, and thus the temperature distribution in the cell may not be uniform. The copolymer of Example 2 shows a higher level of absorbance than that of Example 1. This is because the graft ratio of oligo NIPAAm in the copolymer of Example 2 is higher than that of Example 1, and thus the copolymer of Example 2 shows a higher degree of hydrophobicity as the temperature increases. The higher degree of the hydrophobicity may result in the increase in the size and the number of the self-aggregated product.

Experimental Example 3

Evaluation of Forward Osmosis Performance

Osmotic flow analysis is conducted with respect to the draw solutions including the copolymers of Example 3 and Example 4, respectively, in accordance with the following manner. The osmotic flow is evaluated with a hand-made, U-shaped semi-dynamic forward osmosis apparatus. To test performance of the draw solute, a semi-permeable commercialized FO membrane (cellulose trifluoroacetate) (Hydration Technology Innovation (HTI), USA) is placed in the middle of the apparatus. Each side is filled with distilled water as a feed solution and a draw solution with predetermined concentrations, respectively. The selective layer is faced toward the feed solutions and osmotic water flux from feed to draw solutions is calculated from the volumetric change of each solution during 1 hr after 30 min. The reversed solute flux from draw to feed solution through the membrane is measured by conductivity, inductively coupled plasma optical emission spectroscopy (ICP-OES), and total organic carbon (TOC). The results are compiled in Table 6 and Table 7.

TABLE 6

| DS | Flux [LMH] | | | | | |
| --- | --- | --- | --- | --- | --- | --- |
| Conc. | Reference Example 1 | | Example 3 | | Example 4 | |
| [g/ml] | Avg. | STD | Avg. | STD | Avg. | STD |
| 0.25 | 5.163 | 0.055 | 5.447 | 0.095 | 4.151 | 0.091 |
| 0.5 | 6.198 | 0.072 | 6.46 | 0.107 | 4.897 | 0.095 |
| 1 | 7.464 | 0.08 | 7.35 | 0.432 | 6.245 | 0.27 |

TABLE 7

| DS | RSF [GMH] | | | | | |
| --- | --- | --- | --- | --- | --- | --- |
| Conc. | Reference Example 1 | | Example 3 | | Example 4 | |
| [g/ml] | Avg. | STD | Avg. | STD | Avg. | STD |
| 0.25 | 4.140 | 0.250 | 0.250 | 0.098 | 0.160 | 0.067 |
| 0.5 | 4.968 | 0.120 | 0.320 | 0.050 | 0.192 | 0.050 |
| 1 | 5.960 | 0.250 | 0.429 | 0.064 | 0.230 | 0.060 |

The results of Tables 6 and 7 confirm that the draw solutions containing the copolymers of Example 3 and Example 4 exhibit high water flux and low reverse salt flux against the feed solution.

Experimental Example 4

Recovery Test

For the draw solutions, each containing the copolymers of Example 1 to 6, respectively, the recovery tests are conducted by filtration with using a microfiltration membrane at 40° C. and under normal pressure. The test results confirm that the draw solute may be separated/recovered at an efficiency of at least 94.1% under such conditions. By contrast, the draw solution containing the polymer of Reference Example 1 is not able to be separated under the same conditions.

Experimental Example 5

Determination of LCST

For each of the copolymers of Examples 3 to 8, the lower critical solution temperature is measured at different concentrations in the same manner as set forth in Experimental Example 2. The results are compiled in Table 8.

TABLE 8

| substance Mole Conc. [M] | Example 3 | Example 4 | Example 5 | Example 6 | Example 7 | Example 8 |
| --- | --- | --- | --- | --- | --- | --- |
| | Lower critical solution temperature (° C.) | | | | | |
| 1.00E−03 | 40.47 | 40.22 | 40.87 | 40.72 | 40.37 | 40.87 |
| 5.00E−04 | 44.08 | 43.67 | 44.58 | 44.07 | 43.72 | 44.07 |

TABLE 8-continued

| substance Mole Conc. [M] | Example 3 | Example 4 | Example 5 | Example 6 | Example 7 | Example 8 |
|---|---|---|---|---|---|---|
| | Lower critical solution temperature (° C.) | | | | | |
| 2.50E−04 | 52.42 | 50.67 | 52.82 | 51.17 | 49.4 | 49.4 |
| 1.25E−04 | 60.48 | 58.34 | 60.98 | 60.34 | 60.34 | 57.07 |
| 6.25E−05 | 61.93 | 61.72 | 62.33 | 62.22 | 62.22 | 57.62 |
| 3.13E−05 | 63.74 | 62.74 | 64.24 | 63.24 | 63 | 58.62 |

The results of Table 8 show that the copolymers of Examples 3 to 8 have a relatively lower value of the LCST when the solution has such a concentration that it may generate high osmotic pressure, and thereby the copolymers may be removed at a relatively low temperature.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A thermosensitive copolymer, comprising:
a first repeating unit and a second repeating unit, the first repeating unit having a temperature-sensitive oligomer, the second repeating unit having an ionic moiety and a counter ion bonded to the ionic moiety, the temperature sensitive oligomer being grafted onto the first repeating unit, and the first repeating unit and the second repeating unit being linked to form a polyamino acid backbone;
wherein the first repeating unit is represented by Chemical Formula 6-1, and the second repeating unit is represented by Chemical Formula 6-2,

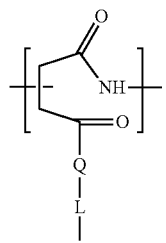

[Chemical Formula 6-1]

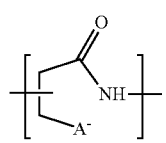

[Chemical Formula 6-2]

$A^-$ being a group including the ionic moiety, $M^+$ being the counter ion, Q being —$NR_5$— or —S—, $R_5$ being hydrogen or a C1 to C5 alkyl group, L being a direct bond, a substituted or unsubstituted C1 to C20 alkylene, or a substituted or unsubstituted C1 to C20 thioalkylene, Og being a temperature sensitive oligomer selected from the group consisting of a first temperature sensitive oligomer including a repeating unit of Chemical Formula 7, a second temperature sensitive oligomer including a repeating unit of Chemical Formula 8, and a third temperature sensitive oligomer including a repeating unit of Chemical Formula 9,

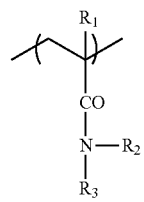

[Chemical Formula 7]

$R_1$ being hydrogen or methyl, wherein $R_2$ and $R_3$ are:
(a) each independently, but not simultaneously, being hydrogen,
(b) a chemical group, the chemical group is selected from the group consisting of at least one of a linear or branched C1 to C6 alkyl group, C3 to C7 cycloalkyl group, and a C6 to C10 aryl group, or
(c) combinable to form a nitrogen containing heterocycle,

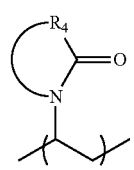

[Chemical Formula 8]

$R_4$ being a C2 to C5 alkylene group,

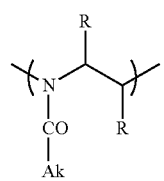

[Chemical Formula 9]

Ak being a linear or branched C1 to C10 alkyl group, R independently being hydrogen or a C1 to C3 alkyl group,
wherein,
the temperature-sensitive oligomer has a polymerization degree of about 2 to about 30,
the ionic moiety of the second repeating unit is an anionic moiety selected from the group consisting of —COO—, —$SO_3^-$, —$PO_3^{2-}$,
a mole ratio of the first repeating unit to the second repeating unit is about 1:99 to about 40:60, and the thermosensitive copolymer has a lower critical solution temperature (LCST) of about 10° C. to about 50° C. at a concentration of 0.01 g/ml, and
the copolymer is structured to dissolve in water at a temperature lower than 10° C.

2. The thermosensitive copolymer of claim 1, wherein the third temperature sensitive oligomer is a polymerization product of a heterocyclic compound and the heterocyclic compound is selected from the group consisting of 2-methyl-oxazoline, 2-ethyl-2-oxazoline, 2-propyl-2-oxazoline, 2-isopropyl-2-oxazoline, 2-butyl-2-oxazoline, 2-isobutyl-2-oxazoline, 2-pentyl-2-oxazoline, and 2-isopentyl-2-oxazoline.

3. The thermosensitive copolymer of claim 1, wherein,
the first temperature sensitive oligomer is a polymerization product of an N-alkyl(meth)acryl amide and the N-alkyl(meth)acryl amide is selected from the group consisting of N-isopropyl(meth)acrylamide (NIPAAm), N-isobutyl(meth)acrylamide, N-isopentyl (meth)acrylamide, N,N-dimethyl(meth)acrylamide, N,N-ethylmethyl(meth)acrylamide, and N,N-diethyl (meth)acrylamide (DEAAM), and
the second temperature sensitive oligomer is a polymerization product of an N-vinyl lactam and the N-vinyl lactam is selected from the group consisting of N-vinyl caprolactam (VCL), N-vinyl-2-pyrrolidone, and N-vinyl-piperidone.

4. The thermosensitive copolymer of claim 1, wherein the first temperature-sensitive oligomer further includes a repeating unit derived from (meth)acrylamide.

5. The thermosensitive copolymer of claim 1, wherein the temperature-sensitive oligomer has a polymerization degree of about 4 to about 25.

6. The thermosensitive copolymer of claim 1, wherein the thermosensitive copolymer has a number average molecular weight of about 5,000 to about 100,000.

7. The thermosensitive copolymer of claim 1, wherein the thermosensitive copolymer includes at least two second repeating units and each of the at least two second repeating units includes a different ionic moiety.

8. The thermosensitive copolymer of claim 1, wherein the counter ion is selected from the group consisting of an alkali metal cation and an alkaline earth metal cation.

9. The thermosensitive copolymer of claim 1, wherein the mole ratio of the first repeating unit to the second repeating unit is about 1:99 to about 10:90.

10. The thermosensitive copolymer of claim 1, wherein $A^-$ is selected from the group consisting of —COO—, —CONR—Z—, —CONR—Z—O—$PO_3^{2-}$, —CO—S—Z—$SO_3^-$, and —CO—S—Z—O-$PO_3^{2-}$, Z is a substituted or unsubstituted C1 to C20 alkylene group, and $M^+$ is selected from the group consisting of $Na^+$, $K^+$, $Li^+$, $Ca^{2+}$, $Mg^{2+}$, and $Ba^{2+}$.

11. The thermosensitive copolymer of claim 1, wherein the thermosensitive copolymer has a number average molecular weight of about 5,000 to about 250,000.

12. The thermosensitive copolymer of claim 1, wherein the copolymer forms an aggregated particle and the aggregated particle is precipitated at a temperature of higher than or equal to the LCST.

13. A method of producing the thermosensitive copolymer of claim 1, comprising:
preparing a polysuccinimide;
preparing the temperature-sensitive oligomer having an amine group or a thiol group at one end and including a repeating unit derived from a monomer represented by Chemical Formula 3, Chemical Formula 4, Chemical Formula 5, or a combination thereof,

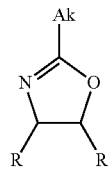

[Chemical Formula 3]

Ak being a linear or branched C1 to C10 alkyl group, R independently being hydrogen or a C1 to C3 alkyl group,

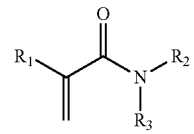

[Chemical Formula 4]

$R_1$ being hydrogen or methyl, $R_2$ and $R_3$ each independently being hydrogen, a linear or branched C1 to C6 alkyl group, a C3 to C7 cycloalkyl group, or a C6 to C10 aryl group, $R_2$ and $R_3$ not simultaneously being hydrogen, $R_2$ and $R_3$ being combinable to form a nitrogen containing heterocycle,

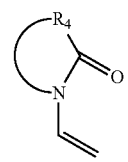

[Chemical Formula 5]

$R_4$ being a C2 to C5 alkylene group;
subjecting the polysuccinimide to a first reaction with the temperature-sensitive oligomer so as to open one or more succinimide rings in the polysuccinimide and to graft the temperature-sensitive oligomer thereto to form a reaction product; and
subjecting the reaction product to a second reaction with an amine compound having an ionic moiety, a thiol compound having the ionic moiety, an inorganic base, or a combination thereof to open a remainder of the succinimide rings in the polysuccinimide and to introduce the ionic moiety and a counter ion to produce the thermosensitive copolymer, the thermosensitive copolymer including a first repeating unit and a second repeating unit, the first repeating unit having the temperature-sensitive oligomer, the second repeating unit having the ionic moiety and the counter ion bonded to the ionic moiety.

14. The method of producing a thermosensitive copolymer of claim 13, wherein the preparing polysuccinimide includes the polysuccinimide having a number average molecular weight of 5,000 or lower.

15. The method of producing a thermosensitive copolymer of claim 13, wherein the subjecting the reaction product to a second reaction includes the amine compound being a phosphoalkyl amine, a sulfoalkyl amine, or a combination thereof, and the inorganic base being an alkalimetal hydroxide, an alkaline earth metal hydroxide, or a combination thereof.

16. An osmotic draw solution, comprising:
an aqueous medium; and
a draw solute dissolved in the aqueous medium, the draw solute including the thermosensitive copolymer of claim 1, the thermosensitive copolymer having an osmotic pressure-inducing polymer chain that includes the ionic moiety and the counter ion bonded to the ionic moiety, the thermosensitive copolymer having a temperature-sensitive oligomer covalently-bonded onto the osmotic pressure-inducing polymer chain in a graft form, the draw solute structured to be recoverable by phase separation at a temperature greater than or equal to a lower critical solution temperature (LCST).

17. The osmotic draw solution of claim 16, wherein the lower critical solution temperature (LCST) is about 10 to about 50° C. at a concentration of 0.01 g/ml of the draw solute relative to the osmotic draw solution.

18. The osmotic draw solution of claim 16, wherein the draw solute has a first solubility of greater than or equal to about 100 g/L at a first temperature below the lower critical solution temperature (LCST) and a second solubility of less than or equal to about 1 g/L at a second temperature of greater than or equal to the lower critical solution temperature (LCST).

19. The osmotic draw solution of claim 16, wherein the draw solute is structured such that about 50 wt % or more of a total of the draw solute exhibits an increase in an aggregate size by at least about 10 times as a temperature of the osmotic draw solution increases from below the lower critical solution temperature (LCST) to above the lower critical solution temperature (LCST).

20. The osmotic draw solution of claim 16, wherein the temperature-sensitive oligomer is an oligomer comprising an amide group and an aliphatic moiety covalently bonded to a nitrogen atom of the amide group, the aliphatic moiety being more hydrophobic than the amide group.

21. The osmotic draw solution of claim 20, wherein the aliphatic moiety is additionally covalently bonded with a carbon atom of the amide group.

22. The osmotic draw solution of claim 20, wherein the aliphatic moiety is not covalently bonded with a carbon atom of the amide group.

23. The osmotic draw solution of claim 20, wherein the temperature-sensitive oligomer is an oligomer including a repeating unit derived from a heterocyclic compound having C, N, and O and having a C=N bond in its ring.

24. A forward osmosis water treatment device, comprising:
a feed solution including water and materials to be separated, the materials to be separated being dissolved in the water;
the osmotic draw solution of claim 16;
a semi-permeable membrane having a first side and an opposing second side, the semi-permeable membrane configured such that the feed solution contacts the first side, and the osmotic draw solution contacts the second side;
a recovery system configured to remove the thermosensitive copolymer from a treated solution that includes water that has moved from the feed solution to the osmotic draw solution through the semi-permeable membrane by osmotic pressure; and
a connector configured to reintroduce the thermosensitive copolymer that has been removed by the recovery system back into the osmotic draw solution contacting the semi-permeable membrane.

25. The forward osmosis water treatment device of claim 24, further comprising:
an outlet configured to discharge treated water that is produced by removing the thermosensitive copolymer from the treated solution in the recovery system.

26. The forward osmosis water treatment device of claim 24, wherein the recovery system includes a microfiltration (MF) membrane, an ultrafiltration (UF) membrane, or a nanofiltration (NF) membrane.

27. The forward osmosis water treatment device of claim 24, wherein the recovery system includes a temperature controller configured to heat the thermosensitive copolymer to a temperature higher than or equal to the lower critical solution temperature (LCST) to facilitate removal of the thermosensitive copolymer from the treated solution.

28. The forward osmosis water treatment device of claim 24, wherein the recovery system includes a temperature controller configured to cool the thermosensitive copolymer that has been removed to a temperature below the lower critical solution temperature (LCST) to facilitate reintroduction of the thermosensitive copolymer back into the osmotic draw solution contacting the semi-permeable membrane.

29. A forward osmosis method for water treatment, comprising:
contacting a feed solution and the osmotic draw solution of claim 16, the feed solution including water and materials to be separated, the materials to be separated being dissolved in the water, the feed solution and the osmotic draw solution being contacted with a semi-permeable membrane positioned therebetween to obtain a treated solution including water that has moved from the feed solution to the osmotic draw solution through the semi-permeable membrane by osmotic pressure;
heating at least a portion of the treated solution to a temperature higher than or equal to the lower critical solution temperature (LCST) to obtain an aggregated thermosensitive copolymer; and
removing the aggregated thermosensitive copolymer from the treated solution by filtration to obtain treated water.

30. The forward osmosis method for water treatment of claim 29, further comprising:
cooling the thermosensitive copolymer that has been removed to a temperature below the lower critical solution temperature (LCST) to obtain a disintegrated thermosensitive copolymer; and
reintroducing the disintegrated thermosensitive copolymer back into the osmotic draw solution contacting the semi-permeable membrane.

* * * * *